US006301881B1

(12) United States Patent
Kumar

(10) Patent No.: US 6,301,881 B1
(45) Date of Patent: Oct. 16, 2001

(54) APPARATUS AND METHOD FOR DIAGNOSIS OF CATALYST PERFORMANCE

(75) Inventor: Sanath V. Kumar, Iselin, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/506,771

(22) Filed: Feb. 18, 2000

Related U.S. Application Data

(63) Continuation of application No. 08/963,171, filed on Nov. 3, 1997, now Pat. No. 6,026,639.

(51) Int. Cl.⁷ ...................................................... F01N 3/00
(52) U.S. Cl. ................................ 60/274; 60/276; 60/277; 60/285; 60/701; 60/103; 60/109; 60/73; 60/23.32; 60/118.1
(58) Field of Search ............................. 60/274, 276, 277, 60/285, 301; 701/103, 109; 73/23.31, 23.32, 118.1, 118.2

(56) References Cited

U.S. PATENT DOCUMENTS

| 4,153,579 | 5/1979 | Summers et al. | 252/462 |
| 4,189,404 | 2/1980 | Keith et al. | 252/462 |
| 4,597,850 | 7/1986 | Takahashi et al. | 204/426 |

(List continued on next page.)

FOREIGN PATENT DOCUMENTS

| 259 175 A2 | 3/1988 | (EP) | G01N/27/56 |
| 704 697 A1 | 4/1996 | (EP) | G01N/27/407 |
| 704 698 A1 | 4/1996 | (EP) | G01N/27/407 |
| 04181149 | 6/1992 | (JP) | G01N/27/00 |
| 05332192 | 12/1993 | (JP) | F02D/45/00 |
| 09088879 | 3/1997 | (JP) | F04D/27/00 |
| 09203339 | 8/1997 | (JP) | F02D/41/16 |
| WO 95/00235 | 1/1995 | (WO) | B01D/53/36 |
| WO 95/35152 | 12/1995 | (WO) | B01D/53/94 |
| WO96/17671 | 6/1996 | (WO) | B01D/53/94 |
| WO97/33165 | 9/1997 | (WO) | G01N/27/407 |

OTHER PUBLICATIONS

SAE 800019, A.H. Meitzler, "Application of Exhaust–Gas–Oxygen Sensors to the Study of Storage Effects in Automative Three–Way Catalyst", 1980*.
SAE 900062, Clemmens, et al., "Detection of Catalyst Performance Loss Using On–Board Diagnostics", presented at the International Congress and Exposition, Detroit, Michigan, Feb. 26–Mar. 2, 1990*.
SAE 910561, Koupal, et al., "Detection of Catalyst Failure On–Vehicle Using the Dual Oxygen Sensor Method", 1991*.
Theis, "An Engine Test to Measure the Oxygen Storage Capacity of a Catalyst"*.
Matlab® Signal Processing Toolbox User's Guide, copyright by Mathworks (Dec. 1996), The Mathworks, Inc. 24 Prime Parkway, Natick, Massachusetts 01760–1500*.

(List continued on next page.)

Primary Examiner—Thomas Denion
Assistant Examiner—Binh Tran
(74) Attorney, Agent, or Firm—Richard A. Negin

(57) ABSTRACT

A method and apparatus that converts time-resolved sensor signals into frequency domain signals using Fast Fourier Transforms and power spectral densities. A signal, as a means to assess catalyst performance such as a signal based on sensing oxygen concentration in motor vehicle exhaust in accordance with the present invention is in the time domain and has multiple components at different frequencies. The use of Fast Fourier Transforms isolates the various spectral density which arise from different frequency components of the complex time domain signal. The analysis has been found to be substantially independent of operating conditions. The power spectral density has found to be a precise indication of oxygen storage and release of the catalyst and catalyst performance. The catalyst performance can be signaled to the vehicle operator for on board diagnostics (OBD) of the catalyst.

46 Claims, 10 Drawing Sheets

U.S. PATENT DOCUMENTS

| | | | |
|---|---|---|---|
| 4,624,940 | 11/1986 | Wan et al. | 502/251 |
| 4,703,555 | 11/1987 | Hübner et al. | 29/611 |
| 4,714,694 | 12/1987 | Wan et al. | 502/304 |
| 4,727,052 | 2/1988 | Wan et al. | 502/327 |
| 4,905,652 | 3/1990 | Nakajima et al. | 123/479 |
| 4,927,517 | 5/1990 | Mizutani et al. | 204/406 |
| 4,934,196 | 6/1990 | Romano | 73/861.38 |
| 4,990,780 * | 2/1991 | Lee et al. | 250/343 |
| 5,057,483 | 10/1991 | Wan | 502/304 |
| 5,106,482 | 4/1992 | Milstein et al. | 204/431 |
| 5,144,560 | 9/1992 | Kurihara et al. | 364/431.04 |
| 5,150,682 * | 9/1992 | Magnet | 123/417 |
| 5,157,919 | 10/1992 | Gopp | 60/274 |
| 5,177,464 | 1/1993 | Hamburg | 340/439 |
| 5,207,107 | 5/1993 | Wolf et al. | 73/861.04 |
| 5,237,818 | 8/1993 | Ishii et al. | 60/274 |
| 5,250,169 | 10/1993 | Logothetis et al. | 204/424 |
| 5,255,072 * | 10/1993 | Mikasa et al. | 356/432 |
| 5,265,417 | 11/1993 | Visser et al. | 60/274 |
| 5,313,791 | 5/1994 | Hamburg et al. | 60/274 |
| 5,341,642 | 8/1994 | Kurihara et al. | 60/276 |
| 5,408,215 | 4/1995 | Hamburg | 340/439 |
| 5,444,974 | 8/1995 | Beck et al. | 60/274 |
| 5,451,371 | 9/1995 | Zanini-Fisher et al. | 422/51 |
| 5,452,576 | 9/1995 | Hamburg et al. | 60/274 |
| 5,473,304 | 12/1995 | Friese et al. | 338/23 |
| 5,476,001 | 12/1995 | Hoetzel et al. | 73/23.31 |
| 5,486,336 | 1/1996 | Dalla Betta et al. | 422/90 |
| 5,492,611 | 2/1996 | Sugama et al. | 204/415 |
| 5,492,612 | 2/1996 | Kennard, III et al. | 204/429 |
| 5,505,073 | 4/1996 | Gerblinger et al. | 73/31.05 |
| 5,505,837 | 4/1996 | Friese et al. | 204/425 |
| 5,553,450 | 9/1996 | Schnaibel et al. | 690/274 |
| 5,642,722 | 7/1997 | Schumacher et al. | 123/673 |
| 5,802,843 | 9/1998 | Kurihara et al. | 60/274 |
| 5,831,145 * | 11/1998 | Logothetis et al. | 73/23.2 |
| 5,887,421 * | 3/1999 | Mitsutani | 60/274 |

OTHER PUBLICATIONS

1994 SAE Handbook, Vol. 1:Materials, Fuels, Emissions, and Noise, published by Society of Automative Engineers, Inc., 400 Commonwealth Drive, Warrendale, PA 15096–0001*.

NGK Spark Plug Co., Ltd., NTK Automotive Sensors, published by NGK Spark Plug Co., Ltd., Sensor Division, 2808, Iwasaki, Komaki, Aichi, 485 Japan, brochure OC–2106(6)–9702 (H) Printed in Japan*.

Meitzler, Allen H.—SAE 800019 (XP–002094829) "Application of Exhaust–Gas–Oxygen Sensors to the Study of Storage Effects in Automative Three–Way Catalysts", 1980, pp. 14–21*.

Sideris, M.—022910 (XP–002094830) (Ford) "Methods for Monitoring and Diagnosing the Effciency of Catalytic Converters", 1998, pp. 29–39.

* cited by examiner upstream sensor ———
downstream sensor ········

Upstream HEGO

Downstream HEGO

U/S Lambda/2

Vehicle Speed

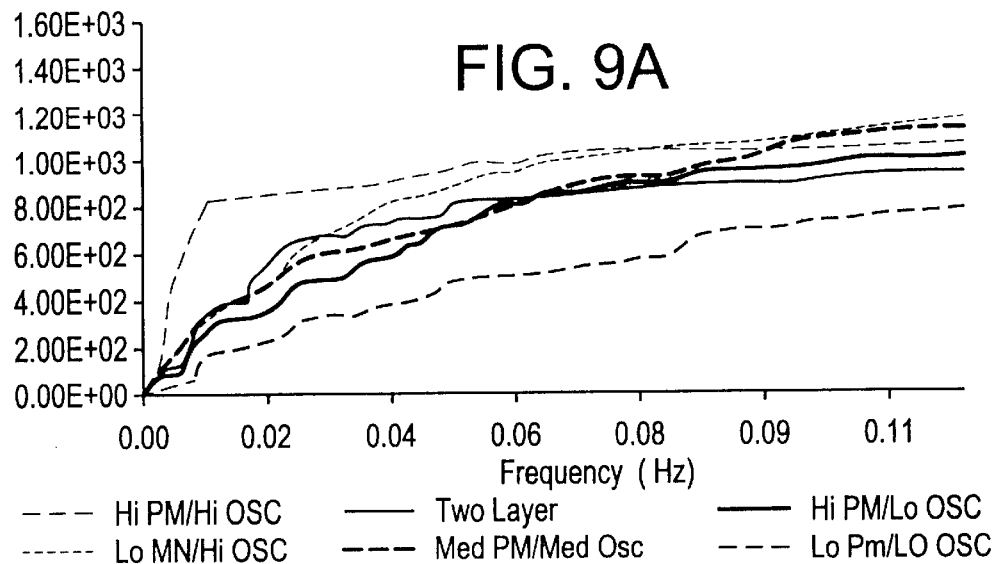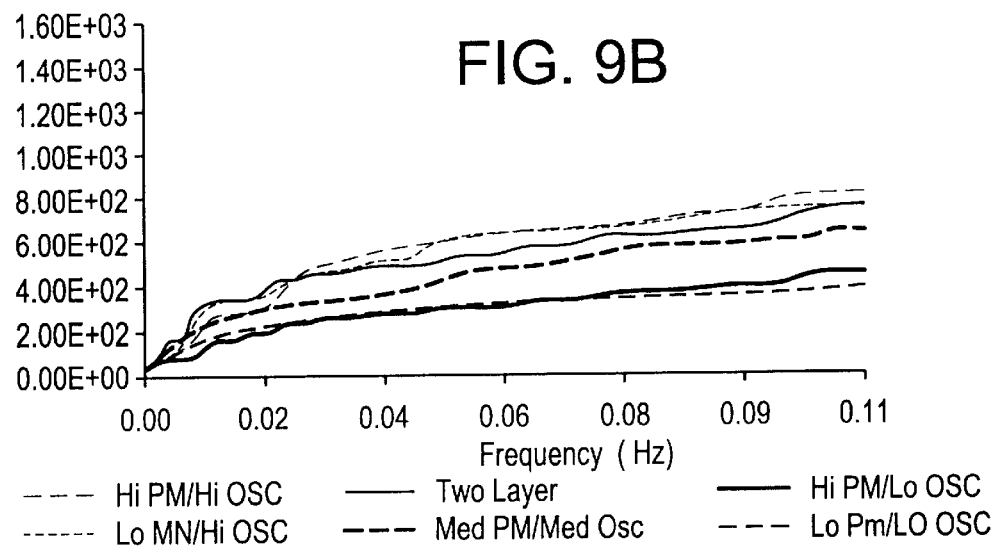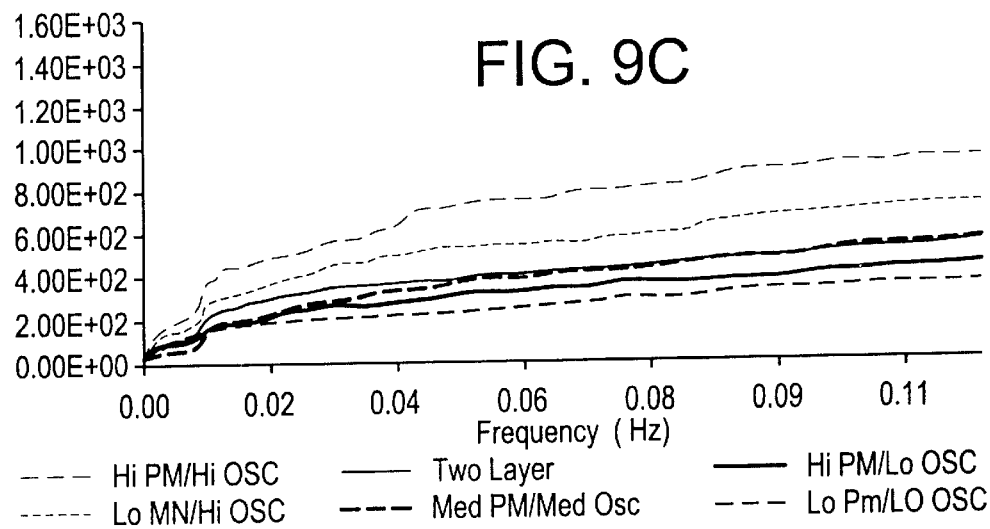

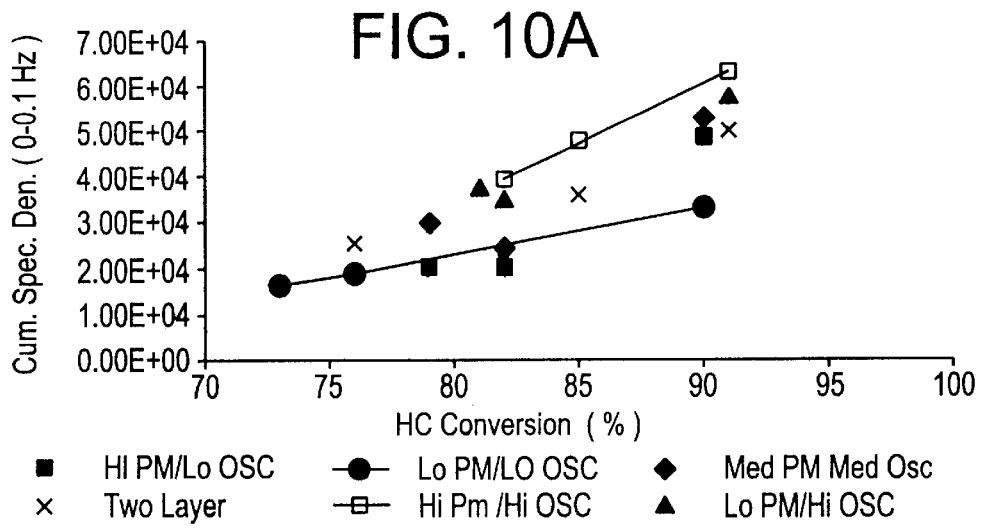
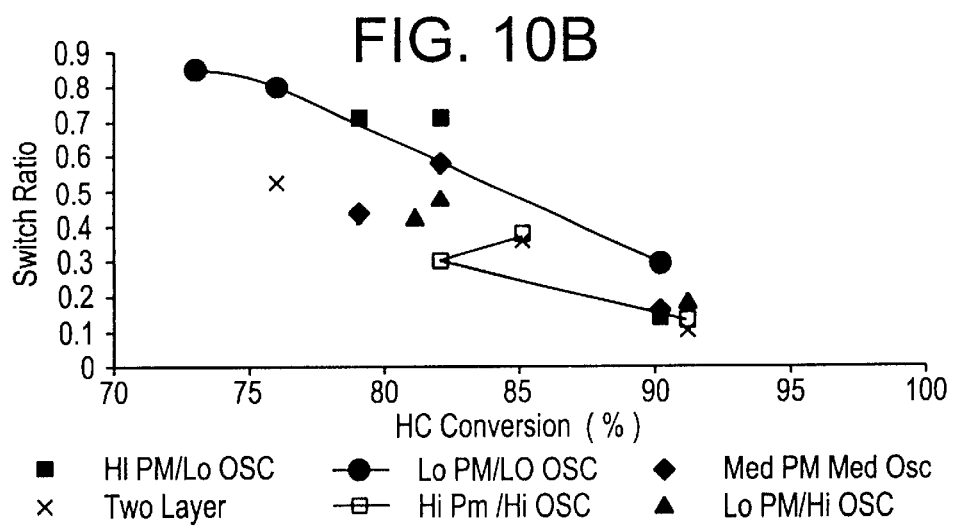
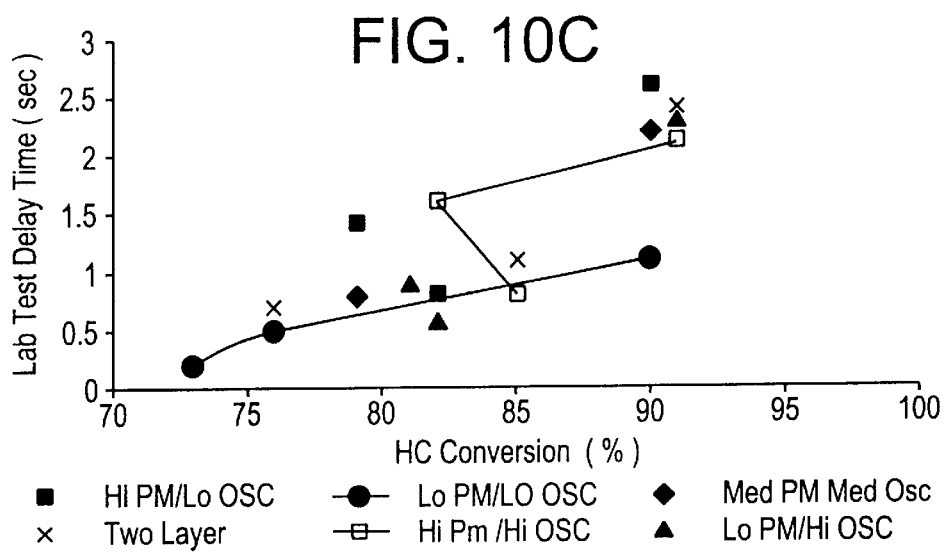

APPARATUS AND METHOD FOR DIAGNOSIS OF CATALYST PERFORMANCE

This Application is a con't of Ser. No. 08/963,171 filed Nov. 3, 1997 U.S. Pat. No. 6,026,639.

BACKGROUND OF THE INVENTION

1. Field of the Invention

The present invention relates to an apparatus and method for diagnosis of catalyst performance comprising a sensor and an algorithm to process the signals from the sensor. In particular, the present invention relates to a method wherein the performance of an motor vehicle exhaust catalyst is assessed based on the frequency of a sensed signal which is based on measurement of a fluctuating parameter.

2. Description of the Prior Art

Catalysts are commonly used as part of exhaust systems to treat motor vehicle exhaust in order to minimize air pollution. The reduction of pollution from motor vehicles is mandated by the Environmental Protection Agency through the Environmental Protection Act. As part of the process to assure compliance, it is common for various motor vehicle regulatory bodies to mandate tailpipe testing of automobiles on a regular basis. In order to avoid the expense of such emissions, inspection and to assure that automobiles on the road are complying with the environmental laws and regulations, there are efforts to develop a system which can sense when the exhaust system is not compliant and signal the vehicle operator accordingly.

It is the goal to monitor the exhaust gas of a motor vehicle during normal operation to determine whether the catalytic converter is performing as required. The apparatus and method to accomplish this is commonly referred to as on-board diagnostics (OBD). The strategy which is contemplated is that the performance of the catalyst is determined based on sensing the exhaust gases to determine whether the catalyst is performing as specified and required. Different sensing means have been proposed but all are required to signal the motor vehicle operator if the catalyst is failing to operate as required.

Sensors useful to measure various components in gaseous exhaust streams such as motor vehicle exhaust streams are known. Useful sensors include oxygen sensors and NOx sensor assemblies. Such oxygen sensors include on/off sensors known as heated exhaust gas oxygen sensors (HEGO) and universal exhaust gas oxygen sensors (UEGO) which is an on/off sensor plus a linear signal which is a function of the air to fuel ratio. Various oxygen sensors have been used and are disclosed in the art including the above referenced sensors. Other useful oxygen sensors include a high speed oxygen sensor disclosed in U.S. Pat. No. 5,106,482, a miniaturized oxygen electrode disclosed in U.S. Pat. No. 5,492,611 and lean shift correction of a potentiometric oxygen sensors disclosed in U.S. Pat. Nos. 5,492,612, 5,486,336 discloses a nitrogen oxide sensor assembly.

Other references disclosing a variety of sensors include U.S. Pat. Nos. 5,451,371; 5,408,215; 5,444,974; 5,177,464; 5,237,818; 5,452,576; and 4,703,555. These references disclose a variety of sensors including hydrocarbon sensors as well as calorimetric, air to fuel ratio sensors and a general combustion measurement sensor.

Approaches to sense whether the catalyst is performing include the use of dual oxygen sensors. In accordance with this method, one oxygen sensor is located upstream of the catalyst and the other downstream of the catalyst. The signals from the upstream and downstream sensors are compared and correlated to the emissions, typically hydrocarbon emissions, to determine whether the catalyst is functioning to reduce hydrocarbon emissions to achieve compliance with the regulations. If the amount of emissions is calculated to exceed a specific amount, a signal can be sent to the motor vehicle console to alert the operator that the system to treat exhaust has failed and repair is required.

The use of a dual oxygen sensor system has been reported in SAE Technical Paper Series No. 900062, Clemmens, et al., "Detection of Catalyst Performance Loss Using On-Board Diagnostics", presented at the International Congress and Exposition, Detroit, Mich., Feb. 26–Mar. 2, 1990. This paper reviews the history of such systems which are commonly referred to as On-Board Diagnostic Systems (OBD). This early study was indicated to be a proof of concept testing study to identify serious losses in catalyst efficiency with a dual oxygen sensor method. In accordance with this disclosure, testing was conducted at steady state conditions. The results showed that this approach resulted in measurable differences in the pre- and post-oxygen signals between catalyst with good and poor conversion efficiencies.

SAE Technical Paper Series No. 910561, Koupal, et al., "Detection of Catalyst Failure On-Vehicle Using the Dual Oxygen Sensor Method" was presented at the International Congress and Exposition, Detroit, Mich., Feb. 25–Mar. 1, 1991. This paper presents the results of a test program that used a dual oxygen sensor coupled with a simulated On-Board Diagnostic Algorithm to attempt detection of seriously deteriorated catalytic converters on a test vehicle operated over the Federal Test Procedure (FTP). Previous work is reviewed which relates to determining the methodologies to detect catalyst failure by observing the effects of three-way catalyst (TWC) conversion activity on a response pattern generated between an oxygen sensor place upstream and oxygen sensor place downstream of the catalyst. One analytical method is referred to which quantified the fluctuation and sensor response by calculating the area underneath the sensor curves for a discrete time period, then taking the difference in sensor wave form area values. This integrated area difference method has been reported in the above reference to Clemmens. The background further references a study in 1980 by A. H. Meitzler, "Application of Exhaust-Gas-Oxygen Sensors to the Study of Storage Effects in Automotive Three-Way Catalyst", SAE Technical Series No. 800019 which used the response delay of a downstream oxygen sensor to an instantaneous air/fuel shift as an indicator of a catalyst oxygen storage mechanism. Koupal studied the adaption of the integrated area difference algorithm developed by Clemmens to on-vehicle test results. The results were that the dual oxygen sensor method using integrated area difference analysis, was able to distinguish between good and bad catalyst under controlled conditions.

Presently, the method disclosed in this SAE Technical Paper Series 910561 is a common method of using dual oxygen sensors for on-board diagnostic system measurement. However, it is extremely difficult to obtain consistent in-field measurements due to inconsistencies and, often, insufficient air to fuel swings.

U.S. Pat. No. 5,237,818 is directed to a conversion efficiency measuring apparatus for catalysts used for exhaust gas purification of internal combustion engines. In accordance with the method described therein a reference signal is attained by a correction function of outputs of air to fuel ratio sensors provided at the upstream and downstream ends of the catalyst during an ordinary air to fuel ratio feedback control period. This reference indicates that a drawback to the use of oxygen sensors is that the sensor located downstream of the catalyst is affected by electrical noises, for example, ignition noise, so that this sensor cannot give accurate information of exhaust gases flowing to the sensor.

In Theis, "An Engine Test to Measure the Oxygen Storage Capacity of a Catalyst (provide source), the oxygen storage capacity of a catalyst is assessed to determine its efficacy based on measurements of upstream and downstream air to fuel ratio.

One method to determine whether the catalyst is performing is to measure the switch ratio of the downstream versus the upstream EGO sensors to determine the oxygen storage capacity of a catalytic converter. Based on this measurement the performance can be assessed (J. W. Koupal, M. A. Sabourin, W. B. Clemmens, "Detection of Catalyst Failure On-Vehicle Using the Dual Oxygen Sensor Method", SAE 910561, 1991). Currently, this is the most common method of using dual oxygen sensors for on-board diagnostic system measurements. However, it is extremely difficult to obtain consistent in-field measurements due to inconsistent and often insufficient air to fuel swings.

Another method of using dual oxygen sensors includes biasing the engine air to fuel ratio either rich or lean, and then determining the time it takes for the downstream HEGO sensor to sensor switch in the engine operating condition, vis-a-vis the upstream HEGO sensor. While this is a more reliable method of determining the oxygen storage capacity of the catalytic converter, it is intrusive. The measurement procedure involves changing the operation condition of the vehicle.

There are two inherent problems relating to the use of the oxygen sensors for on-board diagnostic measurements. One, is that there is no strong relationship between the oxygen storage in the catalytic converter and the hydrocarbon conversion performance of the catalytic converter. Secondly, it is difficult to determine a mode of operation of the vehicle under which reliable, meaningful comparisons can be made between the two sensors. It is therefore a continuing goal to devise an algorithm in combination with a sensor strategy to diagnose working of the catalytic converter.

SUMMARY OF THE INVENTION

For the purpose of the present invention, the following definitions are used:

Control Signal—shall mean a signal based on the control value.

Control Value—shall mean a determined parameter, e.g., number, useful to control a physical system.

Cumulative Spectral Density—shall mean the sum of the spectra (e.g., the Spectral Density) in a frequency range.

Fluctuating Parameter—shall mean a parameter that oscillates with time.

Frequency—shall mean the number of oscillations of a fluctuating parameter in a unit time.

Frequency Parameter—shall mean a parameter that is a function of the parameter value and frequency.

Parameter—a set of physical properties whose values determine the behavior of something such as temperature, concentration, pressure or density.

Parameter Value—shall mean the magnitude of a parameter at a given time.

Preset "Functional" Value—shall mean an independent, previously set comparative number for a function being compared, e.g., Preset Frequency Parameter Value.

Signal—shall mean a communicated measurement (e.g., from a sensor) which is a function of the measured parameter value, such as measured voltage as a function of gas component concentration.

Signal Strength—shall be the magnitude of the signal corresponding to the parameter value, e.g., sinusoidal signal strength corresponds to the amplitude.

Spectral Density (also known as the Power Spectral Density)—shall mean the signal strength (based on Parameter Value) at a given frequency. For example, the signal strength can be the peak value of the fluctuating parameter at each oscillation.

The present invention relates to a method and apparatus that converts time-resolved sensor signals into frequency domain signals using Fast Fourier Transforms and power spectral densities. The signal, as a means to assess catalyst performance such as a signal based on sensing oxygen concentration in motor vehicle exhaust in accordance with the present invention is in the time domain and has multiple components at different frequencies. The signal is so complicated that attempting to assess a dynamic process, such as a motor vehicle exhaust catalyst oxygen storage and release based on the signal can easily go awry due to the instantaneous changes in the signal making precision difficult. In accordance with a specific embodiment of the present invention the spectral density has found to be a much more precise indication of oxygen storage and release of the catalyst than a signal based on instantaneous oxygen concentration. The use of Fast Fourier Transforms isolates the various spectral densities which arise from different frequency components of the complex time domain signal. The analysis has been found to be substantially independent of operating conditions. Thus, when the data is acquired over a period of time, regardless of the engine operating conditions and regardless of the engine speed, the spectral densities have been found to indicate the response frequency of the upstream and downstream sensors as they relate to oxygen storage and release and, therefore, catalyst performance. The preferred sensor is a HEGO type oxygen sensor.

The method of the present invention comprises sensing at least one parameter value as a function of time of at least one fluctuating parameter in a gaseous or liquid stream, such as oxygen or hydrocarbon concentration in an exhaust gas stream. Each of the at least one fluctuating parameters has a corresponding frequency. A frequency parameter, such as spectral density, is determined as a function of at least one of the parameter values and corresponding frequency. A control value can be determined based on the frequency parameter. The frequency parameter can be compared to a preset value to obtain the control value. A control signal can be generated based on the control value.

The preset value is preferably a preset frequency parameter value such as a preset spectral density value or a preset cumulative spectral density value. In a specific and preferred embodiment, the method comprises the step of determining the signal strength of a fluctuating parameter as a function of frequency (spectral density) in a gaseous stream of a motor vehicle exhaust stream. The cumulative spectral density can then be determined over a specific frequency range and used as the frequency parameter.

A frequency parameter can be the spectral density which can be determined as a function of the parameter value and the frequency. This is accomplished by sensing the parameter value, versus time. Based on the sensed signal, Fast Fourier Transforms are used to determine the spectral density. The spectral density can be compared to a preset value to obtain a control value and a control signal can be generated based on the control value. The frequency parameter can be a cumulative spectral density which can be determined as the sum of the spectral densities over a specific frequency range. A control value can be determined based on the frequency parameter. The frequency parameter such as the spectral density or the cumulative spectral density can be compared to a preset value to obtain the control value and control signal can be generated based on the control value. A specific embodiment of the method of the present invention comprises sensing a frequency of fluctuation of a fluctuating parameter in a gaseous stream, such as sensing a gas component concentration in motor vehicle exhaust gas.

In the above embodiments of the present invention, the gaseous stream can comprise nitrogen oxides, hydrocarbons and oxygen and the fluctuating parameter can be the concentration of nitrogen oxides, oxygen or hydrocarbons. The control value can be a function of the component concentration, such as hydrocarbon concentration. The above embodiments of the present invention characterize a particularly useful method since the measurement of only one parameter as a function of time has to be made to determine a control value and generate a control signal based on a control value to control the system. For example, it is only necessary to sense a concentration of a component versus time of a fluctuating parameter such as oxygen concentration downstream of a catalyst in a motor vehicle exhaust system which comprises a catalyst or catalytic converter to determine catalyst performance and signal the same and/or feed the signal to the ECU to help control engine operation.

In an alternative and preferred embodiment, the method of the present invention comprising the steps of sensing an upstream parameter value as a function of time of a fluctuating upstream parameter having an upstream frequency in a gaseous or liquid stream. The upstream parameter value is sensed upstream of a unit operation such as a reactor, catalyst, adsorber or the like which alters the character of the gaseous of liquid stream. An upstream frequency parameter is determined as a function of upstream value and frequency. An upstream control value can be determined based on the upstream frequency parameter. The upstream frequency parameter can be compared to an upstream preset value to obtain the upstream control value. An upstream control signal is generated based on the upstream control value. A downstream parameter value as a function of time of a downstream fluctuating parameter is sensed downstream of the unit operation, such as a reactor, catalyst adsorber or the like which alters the character of the gaseous or liquid stream. The downstream fluctuating parameter has a downstream frequency. A downstream frequency parameter is determined as a function of the downstream parameter value and downstream frequency. A downstream control value can be determined based on the downstream frequency parameter. The downstream frequency parameter can be compared to a downstream preset value to obtain the downstream control value. A downstream control signal is generated based on the downstream control value. The downstream control signal can be adjusted as a function of the upstream control signal.

In a specific embodiment, an upstream parameter value as a function of time of an upstream fluctuating parameter having an upstream frequency in the gas stream is sensed. An upstream spectral density parameter as a function of the upstream fluctuating parameter is determined. An upstream control value can be determined based on the upstream spectral density. Preferably, the upstream spectral density parameter can be compared to an upstream preset value to obtain the upstream control value. An upstream control signal is generated based on the upstream control value. A downstream parameter value as a function of time of a downstream fluctuating parameter having a downstream frequency in a gas stream is sensed. A downstream control value can be determined based on the downstream spectral density. Preferably, the downstream spectral density parameter is determined as a function of downstream fluctuating parameter. The downstream spectral density parameter can be compared to a downstream preset value to obtain a downstream control value. A downstream control signal based on the downstream control value is generated and the downstream control signal is adjusted as a function of the upstream control signal.

In a preferred method of the present invention, an upstream parameter value as a function of time of an upstream fluctuating parameter having an upstream frequency in a gaseous stream is sensed. An upstream cumulative spectral density of the upstream fluctuating parameter is determined for an upstream frequency range. The upstream control value can be determined based on the upstream cumulative spectral density. Preferably, the upstream cumulative spectral density can be compared to an upstream value to obtain the upstream control value. An upstream control signal based on the upstream control value is generated. A downstream parameter value as a function of time of a downstream fluctuating parameter having an downstream frequency in a gaseous stream is sensed. A downstream cumulative spectral density for a downstream preset frequency is determined. A downstream control value can be determined based on the downstream cumulative spectral density. Preferably, the downstream cumulative spectral density can be compared to a downstream preset value to obtain a downstream control value. A downstream control signal is generated based on the downstream control value. The downstream control signal is adjusted as a function of the upstream control signal.

The method of the present invention is particularly useful where the gaseous stream comprises hydrocarbons and oxygen and the upstream fluctuating parameter is the concentration of oxygen at an upstream location. The downstream fluctuating parameter is the concentration of oxygen at a downstream location downstream of the upstream location. In a more specific and preferred embodiment the upstream control value can be a function of the upstream oxygen or hydrocarbon concentration and a downstream control value is a function of the downstream oxygen or hydrocarbon concentration. In preferred embodiments, the downstream control signal is normalized based on the upstream control signal.

In a specific and preferred embodiment useful to treat motor vehicle exhaust systems comprising a catalyst, the present method comprises sensing a downstream oxygen or hydrocarbon concentration in the gaseous exhaust stream of a motor vehicle exhaust system. The gaseous exhaust stream comprises hydrocarbon and oxygen in the exhaust conduit downstream of a hydrocarbon oxidation catalyst located in the exhaust conduit. The downstream oxygen or hydrocarbon concentration has a frequency. A downstream frequency parameter is determined as a function of the frequency of change with the downstream oxygen or hydrocarbon concentration. A downstream control value can be determined based on a downstream oxygen or hydrocarbon concentration. The downstream frequency parameter can be compared to a downstream preset value to obtain the downstream control value. A downstream control signal based on the downstream control value is generated. The performance of the hydrocarbon oxidation catalyst is assessed as a function of the downstream control signal. The control signal is used to signal the performance of the hydrocarbon oxidation catalyst.

In a preferred embodiment using an upstream and downstream oxygen or hydrocarbon sensor, the method of the present invention comprises sensing an upstream oxygen or hydrocarbon concentration as a function of time in a gaseous exhaust stream comprising hydrocarbons and oxygen, in an exhaust conduit upstream of a hydrocarbon oxidation catalyst located in the exhaust conduit. The upstream oxygen or hydrocarbon concentration has a frequency. An upstream frequency parameter is determined as a function of the upstream oxygen concentration and frequency. An upstream control value can be determined based on the upstream fluctuating parameter. The upstream frequency parameter can be compared to an upstream preset value to obtain the upstream control value and an upstream control signal is generated based on the upstream control value. A downstream oxygen or hydrocarbon concentration as a function of time and having downstream frequency of the gaseous exhaust stream is sensed using an oxygen or hydrocarbon sensor in the exhaust conduit downstream of the hydrocarbon oxidation catalyst. A downstream frequency parameter is determined as a function of the downstream oxygen concentration and frequency. A downstream control value can be determined based on the downstream fluctuating parameter. The downstream frequency parameter can be compared to a downstream preset value to obtain the downstream control value. A downstream control signal based on the downstream control value is generated. The downstream control signal can be adjusted as a function of the upstream control signal. The performance of the hydrocarbon oxidation catalyst is assessed as a function of the adjusted downstream control signal. The adjusted downstream control signal is used to signal the performance of the hydrocarbon oxidation catalyst.

The present invention also relates to an apparatus comprising a conduit, a catalyst in communication with the conduit and a sensor located downstream of the catalyst. The sensor comprises a means to measure a downstream parameter value as a function of time of a downstream fluctuating parameter in a gaseous or liquid stream, a means to determine a downstream frequency parameter as a function of the downstream parameter value and downstream frequency, a means to compare the downstream frequency parameter to a preset value downstream frequency parameter to obtain a downstream control value and a means to generate a downstream control signal based on the downstream control value.

An alternate embodiment of the apparatus comprises a conduit, a catalyst in communication with the conduit, an upstream sensor located upstream of the catalyst, the upstream sensor comprising means to measure an upstream parameter value as a function of time of a fluctuating upstream parameter in a gaseous or liquid stream. The upstream fluctuating parameter having an upstream frequency. The apparatus further comprises a means to determine an upstream frequency parameter as a function of the upstream parameter value and upstream frequency. An upstream control value can be determined based on the upstream fluctuating parameter. There can be a means to compare the upstream frequency parameter to an upstream preset value to obtain an upstream control value. There is means to generate an upstream control signal based on the upstream control value. There is a downstream sensor located downstream of the catalyst which comprises a means to measure a downstream parameter value as a function of time of a fluctuating downstream parameter in a gaseous or liquid stream. The fluctuating downstream parameter has a downstream frequency. There is a means to determine a downstream frequency parameter as a function of the downstream parameter value and downstream frequency. A downstream control value can be determined based on the downstream fluctuating parameter. There can be a means to compare the downstream frequency parameter to a downstream preset value to obtain the downstream control value. There is a means to generate a downstream control signal based on the downstream control value. Finally, there is a means to adjust the downstream control signal as a function of the upstream control signal. The frequency parameter can be the spectral density or the cumulative spectral density.

In a specific and preferred embodiment, the apparatus comprises a conduit and a hydrocarbon oxidation catalyst located in the conduit. An upstream sensor selected from an oxygen sensor and a hydrocarbon sensor is located in communication with the conduit upstream of the catalyst and comprises a means to sense upstream gas component concentration as a function of time in a gaseous exhaust stream comprising hydrocarbons and oxygen. The upstream gas component concentration has an upstream frequency. There is also means to determine an upstream frequency parameter as a function of the upstream concentration and upstream frequency. An upstream control value can be determined based on the upstream frequency parameter by a suitable means. There can be a means to compare the upstream frequency parameters to an upstream preset value to obtain the upstream control value and means to generate an upstream control signal based on the control value. There is a downstream oxygen or hydrocarbon sensor located downstream of the catalyst which comprises a means to sense a downstream oxygen or hydrocarbon gas component, selected from concentration of the gaseous exhaust stream, in the exhaust conduit downstream of the hydrocarbon oxidation catalyst. There is a means to determine a downstream frequency parameter as a function of the downstream oxygen or hydrocarbon concentration and downstream frequency. There is a means to determine a downstream control value based on the downstream frequency parameter value. There can be a means to compare the downstream frequency parameter to a downstream preset value to obtain a downstream control value and a means to generate a downstream control signal based on the downstream control value. There is a means to adjust the downstream control signal as a function of the upstream control signal. Finally, there is a means to assess the performance of the hydrocarbon catalyst as a function of the adjusted downstream control signal and generate a performance signal which can be used to signal the performance of the catalyst.

In accordance with the method and apparatus of the present invention when used to determine catalytic performance in an exhaust stream, the power spectral densities useful for the analysis are determined over a frequency range of from 0 to 1.5 (Hz), preferably 0 to 1 (Hz) and can be used in the range of from 0 to 0.5 (Hz), 0 to 0.2 (Hz) and 0 to 0.1 (Hz). When calculating the cumulative spectral density, the sum of the power spectral densities can be taken over the above indicated frequency ranges for use in accordance with the method of the present invention.

A catalyst useful in the apparatus of methods of the present invention preferably comprises a catalytic component and an oxygen storage component.

A preferred embodiment the present invention is the use of dual oxygen sensors in an OBD system to determine and signal catalyst performance. An upstream oxygen sensor is located upstream of the catalyst and a downstream oxygen sensor is located downstream of the catalyst. Signals from the dual oxygen sensors can be converted from time-resolved dual oxygen sensor signals into frequency-domain power spectral densities. The oxygen sensor signals obtained over a period of time are processed via Fast Fourier Transforms, and frequency domain spectral densities of the front and rear sensors obtained. Regardless of the specific operating conditions and level of degradation of the catalyst, a difference in dominant spectral peaks is indicative of the existence of oxygen storage in the catalytic converter. If the spectral peaks are of the same frequency and of similar amplitude, this indicates deactivation of the catalytic converter, in particular, its oxygen storage function.

BRIEF DESCRIPTION OF THE DRAWINGS

FIGS. 9a, 9b and 9c are plots of cumulative spectral densities versus frequency for fresh catalyst and catalyst aged at 950° C. and 1050° C., from Example 2.

FIGS. 10a, 10b and 10c are comparative plots of cumulative spectral density versus HC conversion (FIG. 10a), switch ratio versus HC (FIG. 10b), and Delay Time versus HC conversion (FIG. 10c), from Example 2 and Comparative Examples.

DETAILED DESCRIPTION OF THE PREFERRED EMBODIMENTS

The present invention will be understood by those skilled in the art by reference to the accompanying figures. In particular, FIG. 1 illustrates a schematic diagram of the system of the present invention for an OBD application.

Figure 1:
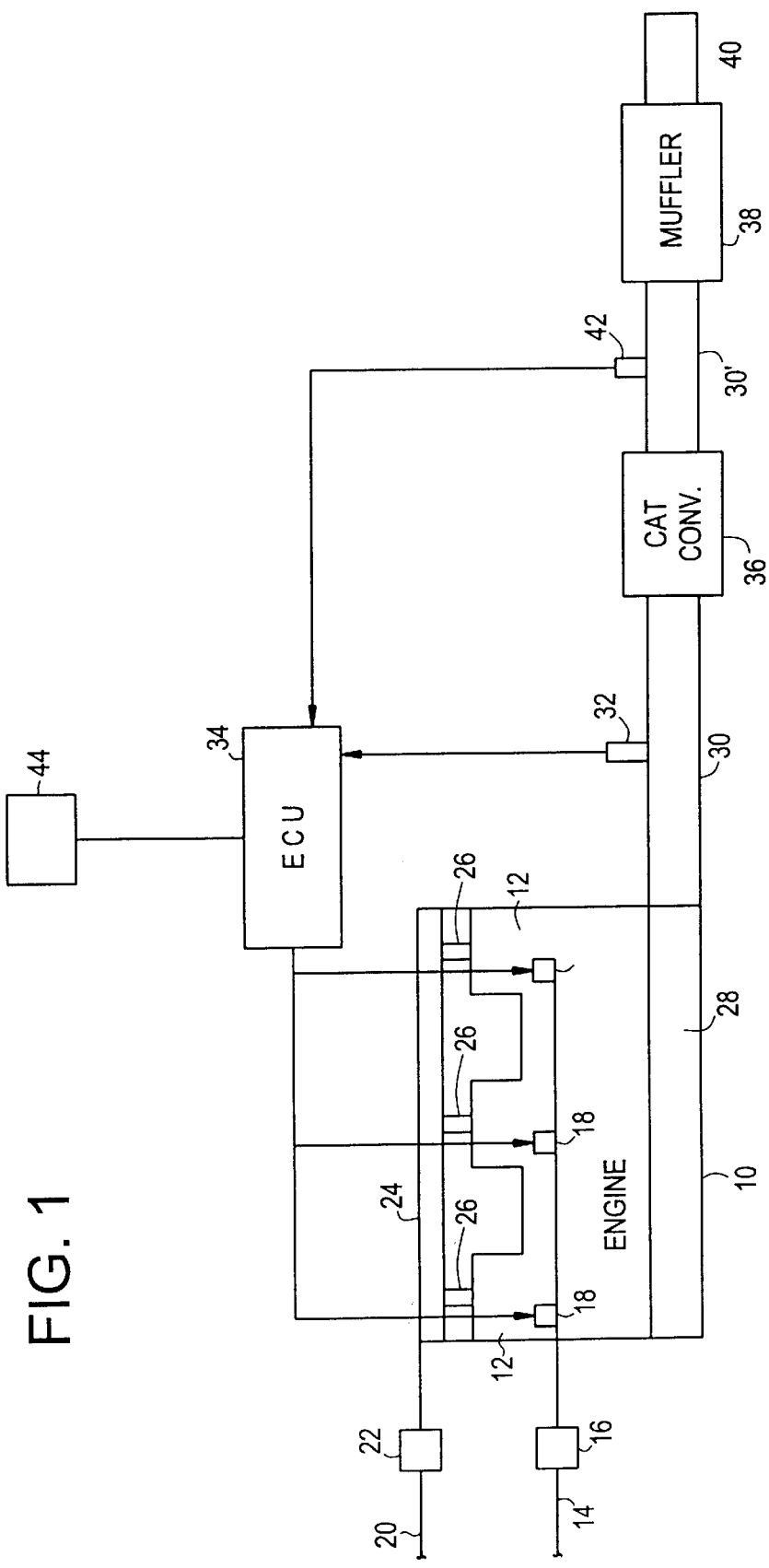
FIG. 1 illustrates a schematic diagram of the system of the present invention.

FIG. 1 illustrates a useful type of internal combustion engine 10 having six cylinders 12 three of which are shown. Fuel is provided via fuel line 14 through fuel filter 16 to fuel injectors 18 to each cylinder 12. Air flow which can be a function of the opening of a throttle valve (not shown). Air can be provided via air line 20 through air filter 22 to air intake manifold 24 and air injection lines 26 to each cylinder. Upon combustion, exhaust is directed to exhaust manifold 28 which is connected to and in communication with exhaust line 30. There can be a suitable upstream sensor means such as oxygen sensor 32 in exhaust line 30. The oxygen sensor 32 also referred to as an upstream oxygen sensor feeds a signal to the engine control unit (ECU) 34, the signal being correlated to the concentration of oxygen in an exhaust stream, passing from the exhaust manifold 28 into the exhaust line 30. The engine control unit 34 controls operation of the engine including the air to fuel ratio ignition timing, the cooling system and the idle speed control system. The engine control unit 34 calculates a fuel injection amount and an ignition timing. Fuel injectors 18 provide fuel to the engine according to a calculated fuel injection signal. The amount of fuel injected through fuel injectors 18 to the cylinders 12 can be controlled based on a signal from the engine control unit 34. A suitable ignition device such as a spark plug (not shown) outputs an ignition spark.

A catalyst located in a catalytic converter 36 converts harmful materials passing through the exhaust line 30 to harmless materials. As discussed below such catalysts catalyze the oxidation of carbon monoxide and hydrocarbons, and catalyze the reduction of nitrogen oxides. The upstream sensor 32 located upstream of the catalytic converter 36 provides a signal corresponding to the composition of the exhaust stream in exhaust line 30. In the preferred embodiment the parameter measured corresponds to the oxygen concentration of the exhaust gas. The engine control unit 34 incorporates this signal and can use it to control the supply of fuel to the engine 100. The exhaust gas passes through exhaust line 30 to catalytic converter 36 to exhaust line 30', then to muffler 38 and from muffler 38 to exhaust pipe 40 to the atmosphere.

In accordance with the present invention there is a downstream sensor 42 which can be any suitable sensor for sensing a parameter value as a function of time of a fluctuating parameter in the exhaust gas stream in exhaust gas conduit 30' downstream of the catalytic converter 36. Referring to FIG. 1 upstream sensor 32 is preferably a HEGO oxygen sensor which sensors the concentration of oxygen in exhaust line 30. The oxygen concentration is converted to a voltage signal which is fed to the ECU 34 or to other suitable calculating means. Downstream sensor 42 is preferably a HEGO oxygen sensor. The downstream oxygen sensor 42 measures the concentration of the oxygen in the exhaust line exiting from the catalytic converter 36. UEGO type sensors can also be used in gaseous exhaust streams for OBD applications, but are generally not, due to cost. UEGO type sensors are preferred for engine control based on sensing in gaseous engine exhaust streams.

A parameter can be chosen which can be related to the operation of the catalyst in catalytic converter 36 to indicate whether or not the catalytic converter is functioning properly. Useful parameters include the concentration of a component of the exhaust gas stream or the temperature of the exhaust gas stream. The method and apparatus of the present invention is particularly useful to measure complex variables which comprise the resultant signal of a plurality of frequency domain signals. The complex or time resolved signal is of the type which can be generated based on parameters such as concentration in motor vehicle exhaust. The concentration of various components in motor vehicle exhaust pertubates due to the generation of exhaust by the action of a plurality of cylinders which separately feed exhaust gases to the exhaust system. A preferred parameter is the concentration of a component selected from $H_2O$, carbon monoxide, oxygen, nitrogen, hydrocarbons and the like. More preferably, the component concentration sensed is the hydrocarbon or oxygen concentration with oxygen concentration most preferred. Hydrocarbon and oxygen concentration have a frequency which can be determined when measuring the concentration as a function of time.

Figure 2:
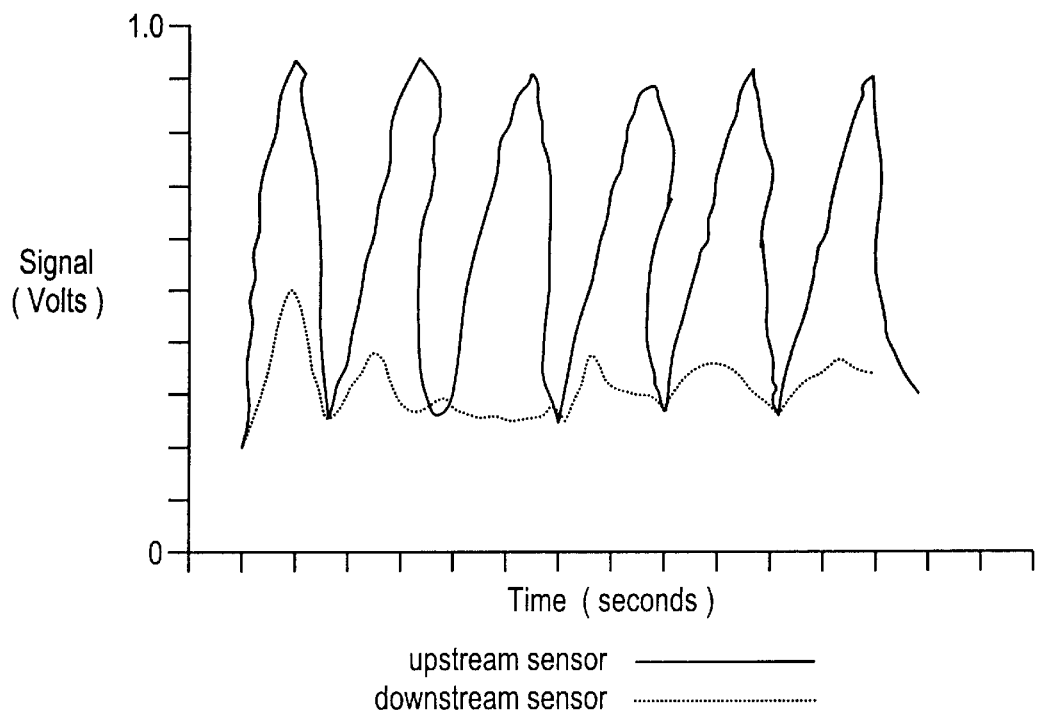
FIG. 2 is a plot of hypothetical fluctuating parameter based on a voltage signal versus time.
Figure 3:
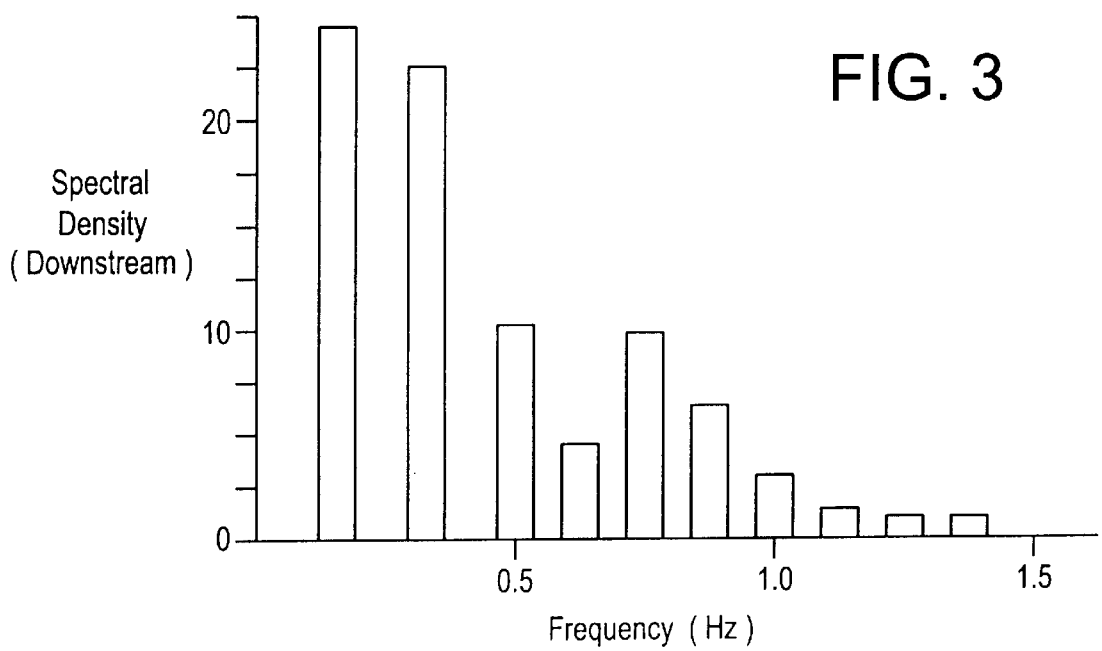
FIG. 3 is a hypothetical plot of spectral density versus frequency based on FIG. 2.

FIG. 2 illustrates a hypothetical fluctuating parameter plot of the voltage outputs of upstream sensor 32 and downstream sensor 42 as a function of time. The spectral density at given frequencies can be determined by the ECU 34. FIG. 3 illustrates a hypothetical graph of the spectral densities determined from the signal versus time plot of FIG. 2. Based on the values illustrated, hypothetical FIG. 3 a cumulative spectral density, which is the sum of the spectra in a given frequency range can be determined. A qualitative view of FIG. 3 indicates that substantially all of spectral density are in a frequency range up to 1 hertz. Therefore, the frequency range used for the cumulative spectral density is up to about 1 hertz. The ECU 34 can be used to determine the cumulative spectral density in a desired frequency range. The cumulative spectral density can be then used as a control value. The control value can then be used to send a control signal from the ECU to an OBD device such as light 44 or to an engine control circuit to control operating parameters of the engine such as the air to fuel ratio or the engine temperature. Light 44 can be a dashboard malfunction indicator light.

The use of spectral density and cumulative spectral density in an automotive exhaust gas control system has been found to be a particularly unique and effective way to asses the performance of the catalytic converter. This is because the signal in the time domain comprises many components at different frequencies. This is illustrated in FIG. 2 and in the Examples. This results in such a complicated signal that attempting to assess catalyst performance based on a catalytic parameter such as catalyst oxygen storage and release based on a signal from a oxygen sensor can easily go awry due to instantaneous changes. This makes precision of an OBD system based on such a voltage signal very difficult. However, in accordance with the present invention the use of spectral density, and more preferably cumulative spectral density, has been found to be a much more precise indicator of catalyst performance. The use of Fast Fourier Transforms isolate the various spectral density which arise from different frequency components of the complex signal. The cumulative spectral density in a predetermined frequency range further enhances the precision of the present method. The analysis has the advantage of being independent of operating conditions when choosing a predetermined frequency range for the cumulative spectral density. A useful and preferred computer software and related text for determining the spectral density and cumulative spectral density is referred to and described in Matlab® Signal Processing Toolbox User's Guide, copyright by Mathworks (December 1996), The Mathworks, Inc. 24 Prime Parkway, Natick, Mass. 01760-1500 hereby incorporated by reference.

Figure 4:
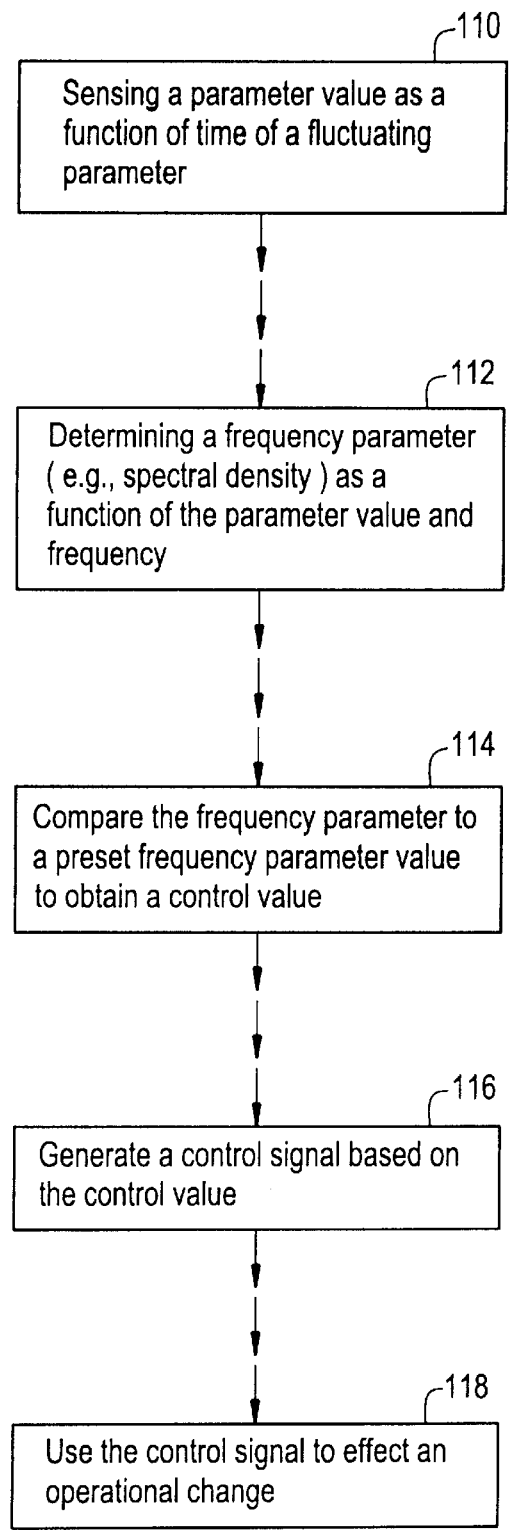
FIGS. 4 and 5 are flow charts for specific embodiments of the present invention.
Figure 5:
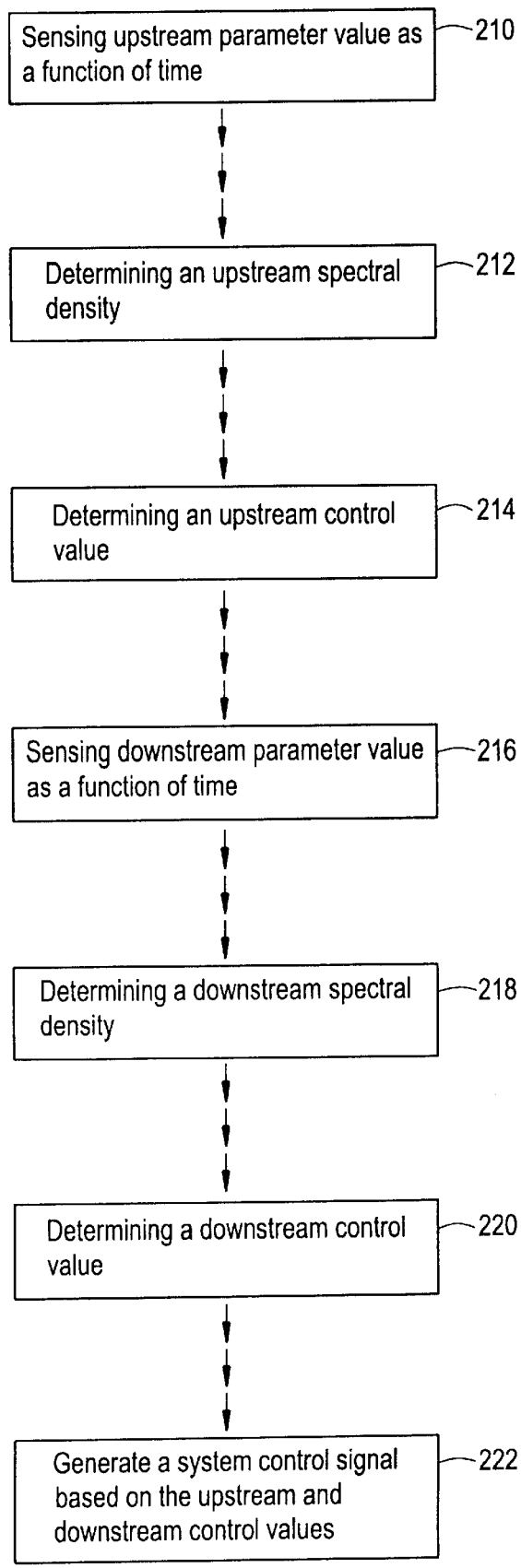
Figure 6A:
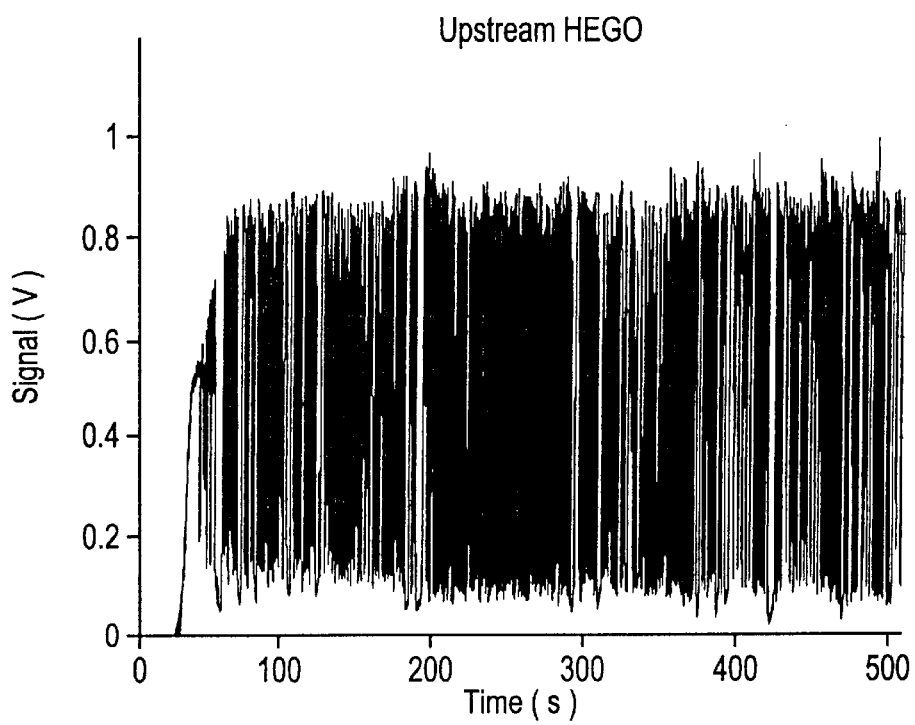
FIGS. 6a and 6b show the time-resolved upstream (FIG. 6a) and downstream (FIG. 6b) HEGO signals from the hot transient portion of an 1975 FTP test for a fresh catalyst of Example 1.
Figure 6B:
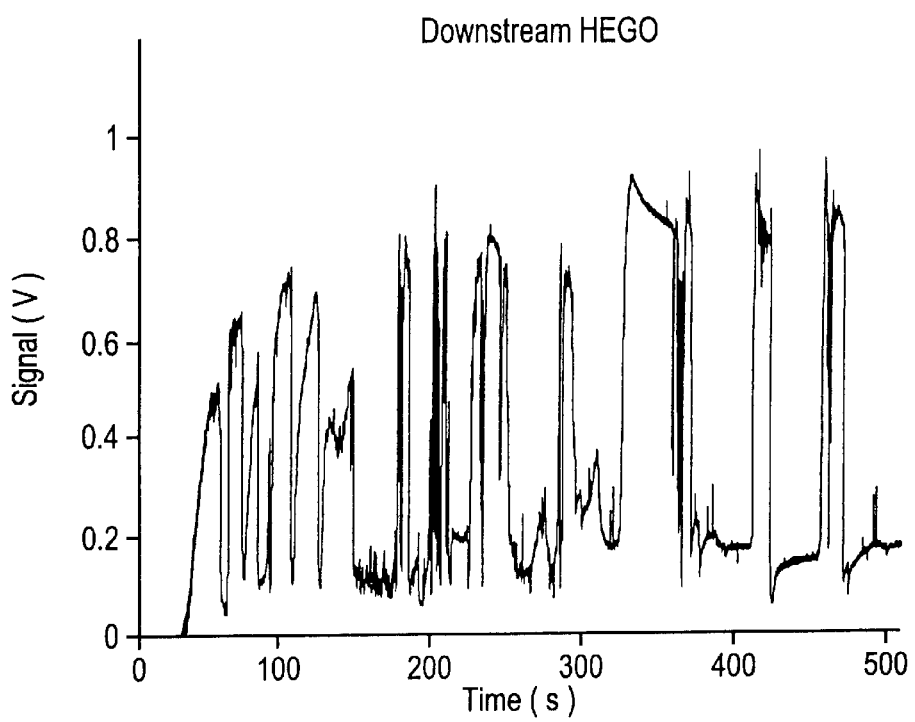
Figure 6C:
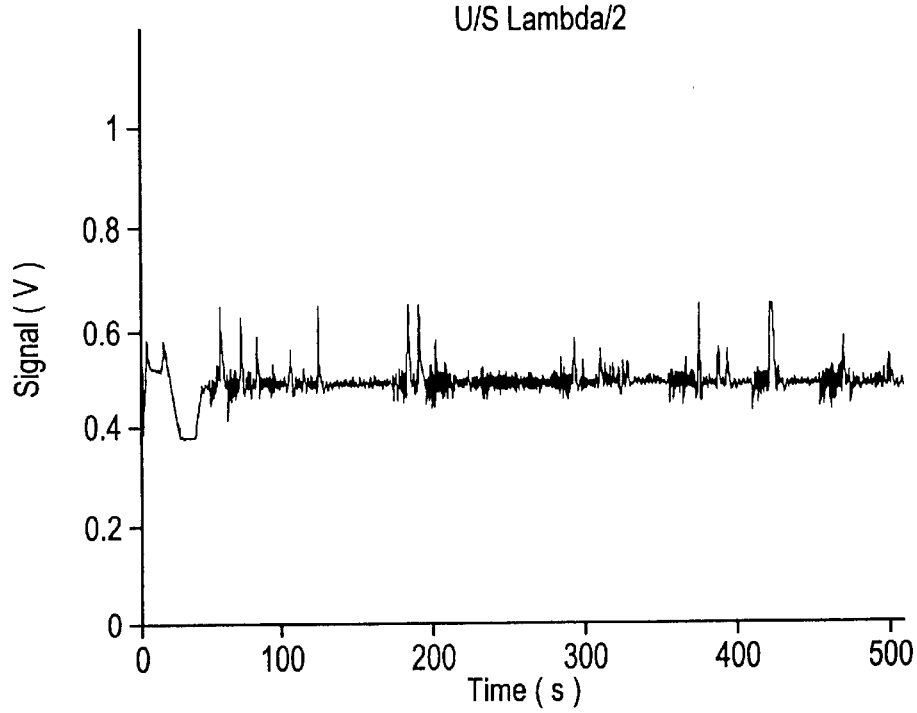
FIGS. 6c and 6d additionally show signals from the engine control unit versus time of FG Lambda divided by 2 (FIG. 6c) and vehicle speed (FIG. 6d), all from Example 1.
Figure 6D:
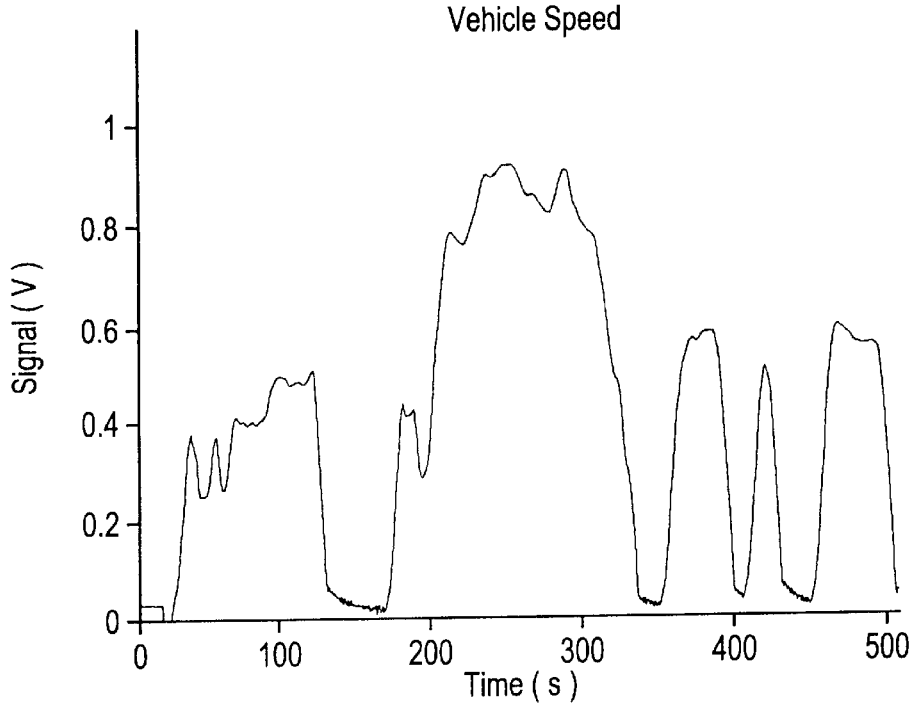

Specific embodiments of the present invention will be understood by reference to the flow charts of various embodiments illustrated in FIGS. 4 and 5.

FIG. 4 illustrates a flow chart for a specific and preferred embodiment of the present invention where only a single sensing device is used, preferably downstream of the catalyst. In accordance with the first step 110 a parameter value, such as oxygen concentration as a function of time is sensed for a fluctuating parameter which can be the oxygen concentration. The sensed parameter value is converted to a sensor signal which is fed to a means for determining a frequency parameter. The frequency parameter is determined as a function of the parameter value and frequency 112. The frequency parameter can be compared to a preset frequency parameter value to obtain a control value 116. A control signal can be generated based on the control value 118.

The means for determining the frequency parameter and comparing the frequency parameter to the preset value to obtain the control value can be accomplished by a suitable means for computation such as are readily available using integrated circuits in calculation means such as computers.

According to a specific embodiment of the process illustrated in FIG. 4 only a downstream parameter value as a function of time is sensed in the exhaust conduit 30'. The downstream parameter value, e.g., oxygen concentration has a downstream frequency. A downstream frequency parameter as a function of the downstream parameter value and downstream frequency is determined. A downstream control value based on the frequency is then determined. A downstream control signal can be generated based on the control value. The downstream control signal can be fed to a suitable means as described above such as engine control unit 34. Alternatively, the downstream frequency parameter can be compared to a downstream preset value to obtain a downstream control value and the downstream control signal based on the downstream control value can be generated. The downstream control signal can thereby be adjusted, or as described below be adjusted as a function of the upstream control signal.

FIG. 5 illustrates a flow chart for a specific and alternate embodiment, which is preferred for use in a system as shown in FIG. 1, to signal whether the catalytic converter 36 is operational. This method and apparatus comprises using both an upstream sensor 32 and a downstream sensor 42. In accordance with the first step 210 a parameter value such as oxygen concentration as a function of time is sensed for a fluctuating parameter which is the oxygen concentration. The signal from upstream sensor 32 is fed to a suitable means, e.g., ECU 34, to determine an upstream frequency parameter, such as upstream spectral density, as a function of the upstream parameter value and upstream frequency of the upstream parameter value 212. An upstream control value is determined based, at least in part, on the upstream frequency parameter 214. For example, the upstream frequency parameter can be compared to an upstream preset value to obtain an upstream control value. An upstream control signal can be generated based on the upstream control value. A downstream parameter value, such as oxygen concentration as a function of time, is sensed for a downstream fluctuating parameter which can be the downstream oxygen concentration 216. The signal from the downstream sensor 42 is fed to a suitable means, e.g., ECU 34 to determine the downstream frequency parameter, such as downstream spectral density, as a function of the downstream parameter value and downstream frequency of the downstream parameter value 218. A downstream control value is determined based, at least in part, on the upstream frequency parameter 220. The downstream frequency parameter can be compared to an downstream preset value to obtain an downstream control value. A downstream control signal is generated based on the downstream control value. The downstream control value can be adjusted based on the upstream control value to obtain a system control signal 222. For example, the downstream control signal can be adjusted as a function of the upstream control signal. The resultant downstream signal can be used to effect OBD or an operational change to the engine.

The above method and more specific and preferred embodiments have been found to be particularly useful in a motor vehicle engine system incorporating a catalytic converter 36 to diagnose and signal to the operator the performance of the catalytic converter. Alternatively, it is recognized that the control signal which is generated based on this system can be used by ECU to help control engine operation based on a reading of exhaust gas parameters.

Means to determine and compare control values can be computer means which can be incorporated into the engine control unit 34 or optionally be separate. A control signal based on the control value can be used to signal a malfunction indicator light 44 such as a light on the dashboard as to whether or not the catalytic converter is functioning properly. Alternatively, the control signal based on the control value can be used in the engine control unit 34 to control the operation of the engine such as by controlling the amount of the air to fuel ratio to the cylinders and/or the temperature in the cooling system (not shown).

The present invention is particularly useful for sensing frequency parameters such as gaseous or particulate concentration of components in engine exhaust gas streams. It is useful in assessing the performance of catalysts used to convert various components of the exhaust stream, such as the oxidation of gaseous carbon monoxide to carbon dioxide, gaseous hydrocarbons to carbon dioxide and water and to reduce particulate pollutants typically found in diesel engine exhaust. Catalysts are also useful to reduce nitrogen oxides to nitrogen and oxygen. The present invention has been found to be particularly useful to assess catalyst performance and signal whether or not such as a catalyst is performing. As indicated above, this is referred as on-board diagnostics (OBD). The sensors can alert the vehicle operator by a suitable means such as a light on the dashboard as to whether or not the catalyst is malfunctioning.

In accordance with the method and apparatus of the present invention when used to determine catalytic performance in an exhaust stream, the power spectral densities useful for the analysis are determined over a frequency range of from 0 to 1.5 (Hz), preferably 0 to 1 (Hz) and can be used in the range of from 0 to 0.5 (Hz), 0 to 0.2 (Hz) and 0 to 0.1 (Hz). When calculating the cumulative spectral density, the sum of the power spectral densities can be taken over the above indicated frequency ranges for use in accordance with the method of the present invention.

A particularly useful and illustrative embodiment of the present invention is the use of dual oxygen sensors to generate signals which can be used to determine whether the exhaust catalyst is functioning properly to convert hydrocarbons to carbon dioxide and oxygen. Such catalysts can be used as oxidation catalyst or as part of three-way catalysts (TWC) which convert gaseous exhaust to carbon dioxide and water. Alternatively, the catalysts can be of the type used to treat diesel exhaust which contain gaseous hydrocarbons as well as particulate hydrocarbons in the form of volatile organics and dry soot.

The method and apparatus of the present invention when using dual oxygen sensors as the upstream and downstream sensors are particularly useful to assess the performance of catalysts based on their oxygen storage capacity. Preferably, such catalyst contain an oxygen storage component. Useful and preferred catalysts which contain oxygen storage components are three-way catalysts used to treat gasoline engine exhausts. Typically, oxygen storage components store oxygen when the engine is running lean and release the oxygen to enhance oxidation when the engine is running rich, causing the exhaust gas to have a lower concentration of oxygen. It has been found that the viability of a catalyst with aging can be related to the catalysts performance based on the oxygen storage capability. A measurement of the oxygen concentration can therefore be an indicator of the effectiveness of hydrocarbon conversion.

Preferred catalysts and catalyst structures which contain oxygen storage components are disclosed in W095/35152, W095/00235 and W096/17671 hereby incorporated by reference.

Preferred embodiments of the present invention are directed to a system for on board diagnostics (OBD) of a catalyst useful to treat motor vehicle engine exhaust. The catalyst can be in the form of a catalyst composition supported on a substrate such as a ceramic or metal monolith. The catalyst can be a coating on the substrate of one or more catalyst composition layers. Useful catalyst compositions can be a in the form of one or more coatings. A preferred catalyst useful with the system of the present invention is a three-way conversion catalyst (TWC). The TWC catalyst composite of the present invention simultaneously catalyzes the oxidation of hydrocarbons and carbon monoxide and the reduction of nitrogen oxides in a gas stream.

Such compositions typically comprise a catalytically active component. A useful and preferred component is a precious metal, preferably a platinum group metal and a support for the precious metal. Preferred supports are refractory oxides such as alumina, silica, titania, and zirconia. A catalyst system useful with the method and apparatus of the present invention comprises at least one substrate comprising a catalyst composition located thereon. The composition comprises a catalytically active material, a support and preferably an oxygen storage component.

Useful catalytically active components include at least one of palladium, platinum, rhodium, ruthenium, and iridium components, with platinum, palladium and/or rhodium preferred. Precious metals are typically used in amounts of up to 300 g/ft$^3$, preferably 5 to 250 g/ft$^3$ and more preferably 25 to 200 g/ft$^3$ depending on the metal. Amounts of materials are based on weight divided by substrate (honeycomb) volume.

Useful supports can be made of a high surface area refractory oxide support. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 m$^2$/g.

Preferred oxygen storage components have oxygen storage and release capabilities. The oxygen storage component is any such material known in the art, preferably at least one oxide of a metal selected from the group consisting of rare earth metals, and most preferably a cerium or praseodymium compound, with the most preferred oxygen storage component being cerium oxide (ceria). The oxygen storage component can be present at least 5 wt. % and preferably at least 10 wt. % and more preferably at least 15 wt. % of the catalyst composition. The oxygen storage component can be included by dispersing methods known in the art. Such methods can include impregnation onto the composition by impregnating the oxygen storage component onto the a support such as a palladium containing support in the form of an aqueous solution, drying and calcining the resulted mixture in air to give a first layer which contains an oxide of the oxygen storage component in intimate contact with the palladium component. Examples of water soluble or dispersible, decomposable oxygen storage components which can be used include, but are not limited to water soluble salts and/or colloidal dispersions of, cerium acetate, praseodymium acetate, cerium nitrate, praseodymium nitrate, etc. U.S. Pat. No. 4,189,404 discloses the impregnation of alumina-based support composition with cerium nitrate.

Alternatively, the oxygen storage component can be a bulk oxygen storage composition comprising an oxygen storage component which is preferably ceria, and/or praseodymia in bulk form. Ceria is most preferred. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles. Cerium oxide and praseodymium oxide are the most preferred oxygen storage components.

The performance of the catalyst composition can be enhanced by the use of an alkaline earth metal which is believed to act as a stabilizer, at least one rare earth metal component selected from lanthanum, praseodymium and neodymium which is believed to act as a promoter, and at least one zirconium component.

A useful and preferred catalyzed article can be a layered catalyst composite comprises a first (bottom) layer comprising a first layer composition and the second (top) layer comprising a second layer composition. Such articles are disclosed in WO95/00235.

Briefly, the first layer comprises a first platinum group metal component, which comprises a first palladium component, which can be the same or different than that in the second layer. For the first layer to result in higher temperature conversion efficiencies, an oxygen storage component is used in intimate contact with the platinum group metal. It is preferred to use an alkaline earth metal component believed to act as a stabilizer, a rare earth metal selected from lanthanum and neodymium metal components which is believed to act as a promoter, and a zirconium component. The second layer comprises a second palladium component and optionally, at least one second platinum group metal component other than palladium. Preferably the second layer additionally comprises a second zirconium component, at least one second alkaline earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The first layer optionally further comprises a second oxygen storage composition which comprises a second oxygen storage component. The second oxygen storage component and/or the second oxygen storage composition are preferably in bulk form and also in intimate contact with the first platinum group metal component.

In a preferred embodiment the first layer can comprise a first palladium component and relatively minor amounts of a first platinum group metal other than palladium and/or the second layer can comprise a second palladium component and relatively minor amounts of a second platinum group metal component other than a palladium component. The preferred first and second platinum group components are selected from platinum, rhodium, and mixtures thereof. The preferred first platinum group metal component other than palladium is platinum and the most preferred second platinum group metal component other than palladium is selected from rhodium, platinum, and mixtures thereof. Typically the first layer will contain up to 100 percent by weight of palladium as the platinum group metal. Where a first platinum group metal component other than palladium is used, it is used typically in amounts up to 40 and preferably from 0.1 to 40, more preferably from 5 to 25 percent by weight based on the total weight of the first palladium component and the platinum group metal components other than palladium in the first layer. Where a second platinum group metal component other palladium is used, it is used typically in amounts up to 40 and preferably from 0.1 to 40, more preferably from 5 to 25 percent by weight based on the total weight of the second palladium component and the platinum group metal components other than palladium in the second layer.

The catalyst of this embodiment preferably comprises a palladium component present in each of the first and second layers, in the catalytically-active, promoting component in an amount sufficient to provide compositions having significantly enhanced catalytic activity due to the palladium component. In a preferred embodiment the first palladium component is the only platinum group metal component in the first layer, and the second palladium component is the only platinum group metal component in the second layer. Optionally either or both of the first and second layers can further respectively comprise a first and second useful platinum group metals include, for instance, platinum, ruthenium, iridium and rhodium, and mixtures or alloys of such metals, e.g., platinum-rhodium.

The first layer composition and second layer composition respectively comprise a first support and a second support which can be the same or different components. The support is made of a high surface area refractory oxide support as recited above. The first layer and second layer compositions preferably comprise a support such as alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 g/in$^3$ of catalytic composition coating.

The catalyst of the present invention preferably contains a first oxygen storage component, as recited above, in the first or bottom layer which is in intimate contact with a palladium component. The oxygen storage component is any such material known in the art and preferably at least one oxide of a metal selected from the group consisting of rare earth metals and most preferably a cerium or praseodymium compound with the most preferred oxygen storage component being cerium oxide (ceria). The oxygen storage component can be present at least 5 wt. % and preferably at least 10 wt. % and more preferably at least 15 wt. % of the first layer composition. In the composition of the first or bottom layer, the oxygen storage component can be included by dispersing methods known in the art such as by impregnating the oxygen storage component onto the palladium containing support in the form of an aqueous solution, drying and calcining the resulted mixture in air.

In the first or bottom layer, and in the top or second layer there is optionally a first bulk oxygen storage composition comprising an oxygen storage component which is preferably ceria, and/or praseodymia in bulk form as recited. By bulk form it is meant that a composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. No. 5,057,483 both hereby incorporated by reference.

In addition to the above listed components of the first layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first layer composition and second layer composition comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

In each of the first layer and second layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the first layer composition and the second layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the first layer composition and the second layer composition contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first layer composition and/or the second layer composition of the present invention can contain other conventional additives such as sulfide suppressants, e.g., nickel or iron components. If nickel oxide is used, an amount from about 1 to 25% by weight of the first coat can be effective. As disclosed in U.S. Pat. No. 5,057,483 hereby incorporated by reference.

A particularly useful layered catalyst composite of the present invention comprises in the first layer from about 0.003 to 0.3 g/in$^3$ of the first palladium component; from about 0 to 0.065 g/in$^3$ of the first platinum group metal component other than palladium; from about 0.15 to about 2.0 g./in$^3$ of the first support, i.e., alumina; at least about 0.05 g/in$^3$ of the total first oxygen storage component in intimate contact with the palladium component; from about 0.025 to about 0.5 g/in$^3$ of at least one first alkaline earth metal components; from about 0.025 to about 0.5 g/in$^3$ of the first zirconium component; from about 0.025 to about 0.5 g/in$^3$ of at least one first rare earth metal component selected from the group consisting of lanthanum metal components and neodymium metal components; and comprises in the second layer from about 0.003 to 0.3 g/in$^3$ of the second palladium component and from about 0 to 0.065 g/in$^3$ of a second rhodium component or a second platinum component or mixture thereof, from about 0.15 g/in$^3$ to about 2.0 g/in$^3$ of the second support, i.e., alumina; and from about 0.025 to about 0.5 g/in$^3$ of the second zirconium component. This first and/or second layers can further comprise from about 0.025 g/in$^3$ to about 0.5 g/in$^3$ of a nickel component. The first and/or second layers further can include the particulate composite of zirconia and ceria in amounts from 0.0 to 2.0 g/in$^3$ comprising 60 to 90 wt. % zirconia, 10 to 30 wt. % ceria and from 0 to 10 wt % rare earth oxides comprising lanthana, neodymia and mixtures thereof. Weight of the palladium component and other platinum group metal components are based on the weight of the metal.

A useful and preferred first layer has:
  from about 0.003 to about 0.6 g/in$^3$ of at least one palladium component;
  from 0 to about 0.065 g/in$^3$ of at least one first platinum and/or first rhodium component;
  from about 0.15 to about 2.0 g/in$^3$ of a first support;
  from about 0.05 to about 2.0 g/in$^3$ of the total of the first oxygen storage components in the first layer;
  from 0.0 and preferably about 0.025 to about 0.5 g/in$^3$ of at least one first alkaline earth metal component;
  from 0.0 and preferably about 0.025 to about 0.5 g/in$^3$ of a first zirconium component; and
  from 0.0 and preferably about 0.025 to about 0.5 g/in$^3$ of at least one first rare earth metal component selected from the group consisting of ceria metal components, lanthanum metal components and neodymium metal component.

A useful and preferred second layer has:

from about 0.003 g/in³ to about 0.6 g/in³ of at least one second palladium component;

from 0.0 g/in³ to about 0.065 g/in³ of at least one first platinum and/or rhodium component;

from about 0.15 g/in³ to about 2.0 g/in³ of a second support;

from 0.0 and preferably about 0.025 g/in³ to about 0.5 g/in³ of at least one second rare earth metal component selected from the group consisting of lanthanum metal components and neodymium metal components;

from 0.0 and preferably about 0.25 g/in³ to about 0.5 g/in³ of at least one second alkaline earth metal component; and from 0.0 and preferably about 0.025 to about 0.5 g/in³ of a second zirconium component. However, the first layer requires an alkaline earth metal component and/or a rare earth component, and the second layer requires an alkaline earth metal component and/or a rare earth metal component.

The first and/or second layer can have from 0.0 to about 2.0 g/in³ of an oxygen storage composite comprising particulate form of cera-zirconia composite.

An alternative and useful catalyst composite disclosed in WO95/35152 comprises a first layer comprising at least one first palladium component. The first layer can optionally contain minor amounts of a platinum component based on the total platinum metal of the platinum components in the first and second layers. The second layer comprises at least two second platinum group metal components with one of the platinum group metal components preferably being a platinum component and the other preferably being a rhodium component.

Platinum group metal component support components in the first and second layers can be the same or different and are preferably compounds selected from the group consisting of silica, alumina and titania compounds. Preferred first and second supports can be activated compounds selected from the group consisting of alumina, silica, silica-alumina, alumino-silicates, alumina-zirconia, alumina-chromia, and alumina-ceria.

A specific and preferred embodiment of the present invention relates to a layered catalyst composite comprising a first inner layer which comprises a first support having at least one palladium component and from 0 to less than fifty weight percent based on platinum metal of at least one first layer platinum component based on the total amount of platinum metal in the first and second layers.

Preferably, the first layer comprises a first support, a first palladium component, at least one first stabilizer, and at least one first rare earth metal component selected from ceria, neodymia and lanthana. The first layer can also comprise a first oxygen storage composition which comprises a first oxygen storage component. The second layer preferably comprises a second support, at least one second platinum component, at least one rhodium component, and a second oxygen storage composition. There can be from fifty to one hundred weight percent based on platinum metal of the second layer platinum component based on the total amount of platinum metal in the first and second layers.

The second layer preferably comprises a "second" oxygen storage composition which comprises a diluted second oxygen storage component. The oxygen storage composition comprises a diluent in addition to the oxygen storage component. Useful and preferred diluents include refractory oxides. Diluent is used to mean that the second oxygen storage component is present in the oxygen storage composition in relatively minor amounts. The composition is a mixture which can be characterized as a composite which may or may not be a true solid solution. The second oxygen storage component is diluted to minimize interaction with the rhodium component. Such interaction may reduce long term catalytic activity. The second layer preferably comprises a second oxygen storage composition comprising a second oxygen storage component such as rare earth oxide, preferably ceria. The second oxygen storage component is diluted with a diluent such as a refractory metal oxide, preferably zirconia. A particularly preferred second oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, yttria or mixtures thereof in addition to ceria. A particularly preferred particulate composite comprises ceria, neodymia and zirconia. Preferably there is from 60 to 90 wt. % zirconia, 10–30% ceria and up to 10% neodymia. The ceria not only stabilizes the zirconia by preventing it from undergoing undesirable phase transformation, but also behaves as an oxygen storage component enhancing oxidation of carbon monoxide and the reduction of nitric oxides.

Preferably, the second oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

The second oxygen storage component and optional first oxygen storage component are preferably selected from the cerium group and preferably consist of cerium compounds, praseodymium, and/or neodymium compounds. When using cerium group compounds it has been found that if sulfur is present in the exhaust gas stream, objectionable hydrogen sulfide can form. When it is preferred to minimize hydrogen sulfide, it is preferred to additionally use Group IIA metal oxides, preferably strontium oxide and calcium oxide. Where it is desired to use cerium, praseodymium or neodymium compounds at least one of the first or second layers can further comprise a nickel or iron component to suppress hydrogen sulfide. Preferably, the first layer further comprises a nickel or iron component.

Stabilizers can be in either the first or second layers, and are preferably in the first layer. Stabilizers can be selected from at least one alkaline earth metal component derived from a metal selected from the group consisting of magnesium, barium, calcium and strontium, preferably strontium and barium.

Zirconium components in the first and/or second layers is preferred and acts as both a stabilizer and a promoter. Rare earth oxides act to promote the catalytic activity of the first layer composition. Rare earth metal components are preferably selected from the group consisting of lanthanum metal components and neodymium metal components.

A useful and preferred first layer has:

from about 0.0175 to about 0.3 g/in³ of palladium component;

from about 0 to about 0.065 g/in³ of a first platinum component;

from about 0.15 to about 2.0 g/in³ of a first support;

from about 0.025 to about 0.5 g/in³ of at least one first alkaline earth metal component;

from about 0.025 to about 0.5 $g/in^3$ of a first zirconium component; and from about 0.025 to about 0.5 $g/in^3$ of at least one first rare earth metal component selected from the group consisting of ceria metal components, lanthanum metal components and neodymium metal component.

A useful and preferred second layer has:

from about 0.001 $g/in^3$ to about 0.03 $g/in^3$ of a rhodium component;

from about 0.001 $g/in^3$ to about 0.15 $g/in^3$ of platinum;

from about 0.15 $g/in^3$ to about 1.5 $g/in^3$ of a second support;

from about 0.1 to 2.0 $g/in^3$ of a second oxygen storage composition;

from about 0.025 $g/in^3$ to about 0.5 $g/in^3$ of at least one second rare earth metal component selected from the group consisting of lanthanum metal components and neodymium metal components; and from about 0.025 to about 0.5 $g/in^3$ of a second zirconium component.

The layered catalyst composites can be in the form of a self-supported article such as a pellet with the first layer on the inside and the second layer on the outside of the pellet. Alternatively, and more preferably, the first layer can be supported on a substrate, preferably a honeycomb carrier, and the second layer is supported on the first layer applied on the substrate.

When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. Platinum group metal components are based on the weight of the platinum group metal.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", can be coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried.

Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy The system of the present invention is also useful in combination with a stable close-coupled catalyst, a system comprising such a close-coupled catalyst and a related method of operation as disclosed in WO96/17671.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific component is the temperature at which 50% of that component reacts.

The close-coupled catalyst is placed close to an engine to enable it to reach reaction temperatures as soon as possible. However, during steady state operation of the engine, the proximity of the close-coupled catalyst to the engine, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. A catalyst downstream of the close-coupled catalyst can be an underfloor catalyst or a downstream catalyst. When the underfloor catalyst is heated to a high enough temperature to reduce the pollutants, the reduced conversion of carbon monoxide in the close-coupled catalyst results in a cooler close-coupled catalyst and enables the downstream catalyst typically the underfloor three-way catalyst to burn the carbon monoxide and run more effectively at a higher temperature. The downstream or underfloor catalyst preferably comprises an oxygen storage component as described above.

The close-coupled catalyst preferably is in the form of a carrier supported catalyst where the carrier comprises a honeycomb type carrier. A preferred honeycomb type carrier comprises a composition having at least about 50 grams per cubic foot of palladium component, from 0.5 to 3.5 g/in$^3$ of activated alumina, and from 0.05 to 0.5 g/in$^3$ of at least one alkaline earth metal component, most preferably, strontium oxide. Where lanthanum and/or neodymium oxide are present, they are present in amounts up to 0.6 g/in$^3$.

The present invention is illustrated further by the following Examples which are not intended to limit the scope of this invention.

EXAMPLES

Example 1

The present invention was evaluated using catalyst tested according to a 1975 FTP test using a 4.6 liter engine mounted on a stand with an electric dynamometer. The 1975 FTP test is described in Title 40 Code of Federal Regulations, Part 8b (40 CFR §86) and in particular 40 CFR 86.130-78 to 86.140-82 (1987). A detailed description is recited in the 1994 SAE Handbook, Volume 1:Materials, Fuels, Emissions, and Noise, published by Society of Automotive Engineers, Inc., 400 Commonwealth Drive, Warrendale, Pa. 15096-0001 all herein incorporated by reference. The hot transient portion ("hot 505") of a 1975 FTP test was simulated to acquire signals for 505 seconds of the "hot 505".

A catalytic element was located in the exhaust conduit from the engine and there was an oxygen sensor located upstream of the catalytic element and downstream of the catalyst. The oxygen sensors were heated exhaust gas oxygen sensors (HEGO) which were described in the brochure by NGK Spark Plug Co., Ltd., NTK Automotive Sensors, published by NGK Spark Plug Co., Ltd., Sensor Division, 2808, Iwasaki, Komaki, Aichi, 485 Japan, brochure OC-2106(6)-9702 (H) Printed in Japan. The HEGO sensor used is described in this brochure as a heated zirconia exhaust gas oxygen sensor (HEGO). The sensor is described as having a ceramic heater built into a zirconia sensor element which heats inside the sensor and may be used over a wide range of exhaust gas temperatures. The catalytic element had a single layer of catalyst on a racetrack ceramic substrate having an oval shape with a long diameter of 6.68 inches, a short diameter of 3.18 inches and a depth of 3.18 inches. The substrate had 400 flowthrough channels or cells per square inch (cpsi). The catalyst composition coated on the substrate contained 1.230 g/in$^3$ of high surface area alumina, 200 g/ft$^3$, based on the weight of precious metal, of palladium, 0.16 g/in$^3$ of a neodymia component, 0.100 g/in of a strontium component, 0.100 g/in$^3$ of a zirconia, 0.19 g/in$^3$ of a lanthanum compound. The palladium was supported on the alumina, the composition was ballmilled to a particle size range of 9 to 11 micrometers with 90% of the particles being below 10 micrometers. The composition was formed into a slurry having about 43% by weight final solids and coated onto the substrate and calcined at 550° C. The upstream and downstream HEGO sensor signals were acquired over a period of time. In this Example, as indicated the signals were acquired for the 505 seconds of the hot transient portion ("hot 505") of the 1975 FTP test. The "hot 505" part of the 1975 FTP test was simulated and the HEGO sensor signals were collected at a rate of 50 (Hz). Using a digital data analysis package referred to in the specification, the Power Spectral Density (PSD) of the HEGOs was obtained and compared. The PSD routine computes the magnitude of the Fast Fourier Transform of any signal. The phase of the Fast Fourier Transform can be utilized to determine the phase difference between the upstream and downstream HEGO signals.

Figure 7:
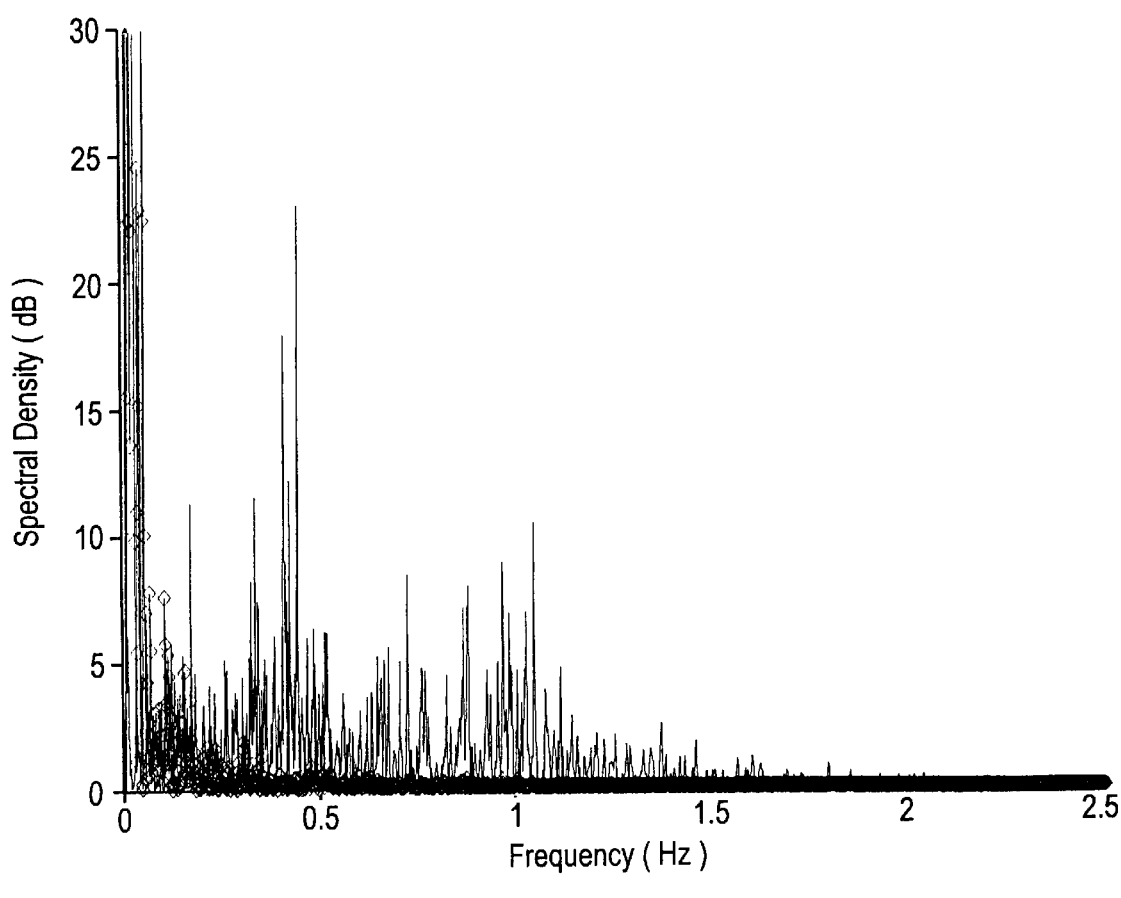
FIGS. 7 and 8 are plots of spectral density versus frequency for fresh and aged samples from Example 1.
Figure 8:
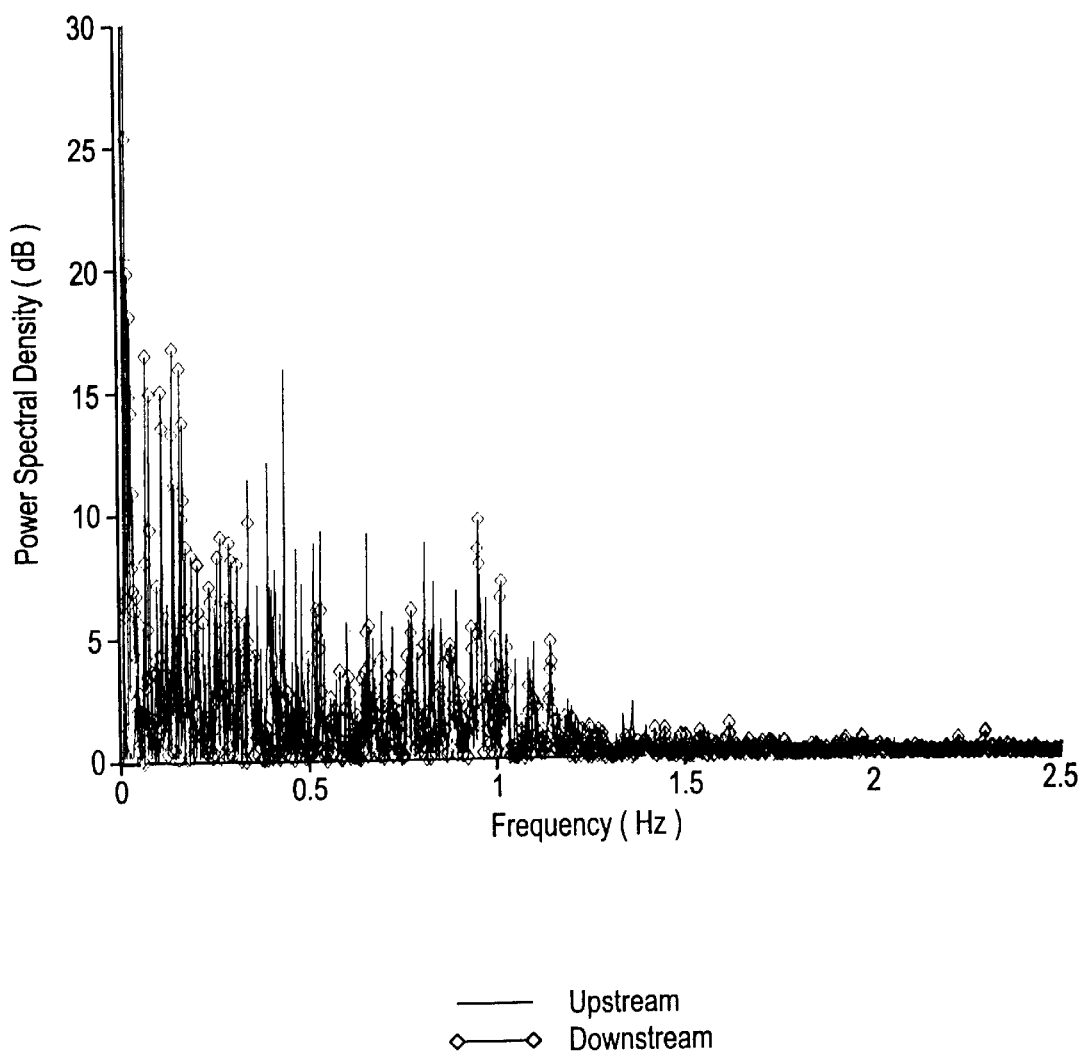

FIG. 6 shows the time-resolved upstream (FIG. 6a) and downstream (FIG. 6b) HEGO signals from the "hot 505" test. The several modes of operation of the engine are shown in FIG. 6, e.g., upstream air/fuel ratio (U/S) versus time in FIG. 6c, and vehicle speed versus time in FIG. 6d, during this test. Various in time-resolved HEGO sensor signals occur with different engine operation modes. Prior art methods such as the use of the values of the "switch ratio" as described in the Background are effected by using results at different modes of operation. Depending upon which mode is chosen for computation of the switch ratio, there will be a wide range of switch ratios generated. This is apparent by considering the downstream HEGO signal versus time as illustrated in FIG. 6b taken in conjunction with the vehicle speed signal versus time as illustrated in FIG. 6d. However, in accordance with the present invention, the power spectral densities (PSD's) of these signals were computed with the results for a fresh catalyst shown in FIG. 7. There is an apparent difference in dominant spectral frequencies and amplitudes between the two HEGO sensor PSD's. The upstream HEGO signal results in a PSD which has peaks in the range of 0.4 to 1 (Hz). This is a reflection of the rate at which the oxygen concentration (and therefore the air to fuel ratio) is oscillating about the stoichiometric value. Since the air to fuel ratio oscillation is dependent upon the engine speed and the exhaust gas flow rate, the peaks are seen at different frequencies. The downstream HEGO signal results in PSD's which have dominant peaks at much lower frequencies, of the order of 0.02 to 0.25 (Hz). This means that due to the oxygen storage capacity of the catalyst being monitored, the air to fuel oscillations of the downstream HEGO are much slower than the upstream HEGO. This being a fresh catalyst, it has a very active oxygen storage function. Fresh catalyst is compared to aged catalyst considering FIG. 8. Here, the PSD's from the HEGO sensors from the same hot 505 test were analyzed. The catalyst being monitored was aged in an oven without forced air for 24 hours at 950° C., and then conditioned on an engine for one hour period of time at stoichiometric conditions and a 700° C. inlet temperature. In FIG. 8, the upstream comparing the PSD's of the upstream and downstream HEGO sensors, it can be seen that both sensor signals have peaks in the same frequency range 0.25 to 1.25 (Hz). However, the downstream sensor also has peaks in the 0.0 to 0.25 (Hz) range. This indicates that the aged catalyst of Example 1 is not totally deactivated.

It is noted that the catalyst used in this evaluation had no significant oxygen storage components. Any oxygen storage capacity is inherent in the components recited above. Nevertheless, a comparison between FIGS. 7 and 8 shows the success of assessing an operational catalyst. FIG. 8 indicates that it is very apparent when the catalyst is deteriorating based on its oxygen storage capacity.

The downstream HEGO sensor signal changes with the level of oxygen storage component and precious metal in the catalyst composition. This, in turn, has a relationship to the hydrocarbon conversion of the catalyst. Although oxygen storage component is not required to be used in the present invention. Specific embodiments where catalyst composition contain an oxygen storage component enhance the ability of the embodiment of the present invention when using one or more oxygen sensors to assess catalytic activity of the catalyst based on oxygen concentration, and signal the vehicle operator.

Example 2 and Comparative Examples

In this example, catalysts were tested in accordance with the present invention using a 1996 Ford Contour having a 2.0 liter ZETEC engine with an automatic transmission and inertia weight of 3,125 lbs. The test used was a 1975 FTP test as recited in Example 1. The oxygen sensors used were the standard production HEGO sensors on the 1996 Ford Contour. The oxygen sensors were 1996 Ford Contour part number 96-BB-9F472-BA made by NTK as recited in Example 1. Each catalytic substrate had the same dimensions as those recited in Example 1. Various substrates were coated with catalyst compositions based on the composition used in Example 1. The precious metal (PM) used as in Example 1 was palladium component with the amount of the palladium in grams per cubic foot based on palladium metal. Samples having high precious metal (Hi PM) contained 200 g/ft$^3$, samples with medium precious metal (Med PM) contained 140 g/ft$^3$ of palladium and samples with low precious metal (Lo PM) contained 80 g/ft$^3$ of palladium. The oxygen storage component (OSC) used with the composition recited in Example 1 was a ceria stabilized zirconia composite which comprises 81 percent zirconia, 20 percent ceria, and 4 percent neodymia. The Example 1 composition had no OSC and is considered to have a low oxygen storage (Lo OSC) component concentration of 0 g/in$^3$, samples with a medium oxygen storage component (OSC) concentration had 0.4 g/in$^3$ and samples with a high oxygen storage component (HI OSC) concentration have 0.8 g/in$^3$. The composition recited in Example 1 is considered to be a high precious metal low oxygen storage component composition (Hi PM/Lo OSC). Various additional samples evaluated were: Hi PM/Hi OSC; Lo PM/Hi OSC; Med PM/Med OSC; and Lo PM/Lo OSC. Example 2 also included a sample having two layers coated on the substrate (two layer). There was a-first layer composition containing in grams per cubic inch 0.53 g/in$^3$ of high surface area alumina support, 0.26 g/in$^3$ of a ceria/neodymia stabilized zirconia composite (as recited above), 0.18 g/in$^3$ of bulk ceria, 0.440 g/in$^3$ of impregnated ceria, 0.2 g/in$^3$ of zirconia, 0.09 g/in$^3$ of a barium component, 0.060 g/in$^3$ of a neodymia, 0.090 g/in$^3$ of lanthana, 0.06 g/in$^3$ of nickel oxide. The second layer or top coat had 0.7 g/in$^3$ of high surface area alumina, 0.2 g/in$^3$ of ceria/neodymia stabilized zirconia, 0.1 g/in$^3$ of zirconia, 0.1 g/in$^3$ of lanthana, 0.1 g/in$^3$ of neodymia and 0.1 g/in$^3$ of strontium oxide. The first layer also contained 45 g/ft$^3$ palladium and the second layer contained 65 g/ft$^3$ of palladium.

Sensor measurements were made at a rate of 50 (Hz) and the above referred to digital data analysis package was used to calculate power spectral densities (PSD's) and results are based on the midbed cumulative spectral densities. The results are illustrated in FIGS. 9a, 9b and 9c. Each of these figures represents a plot of cumulative power spectral densities versus frequency. FIG. 9a is for the catalyst samples tested fresh. FIG. 9b is for catalyst samples aged 24 hours at 950° C. in a furnace without forced air and then run on an engine for 1 hour at stoichiometric conditions and a 700° C. inlet temperature. FIG. 9c contained samples aged at the same aging conditions as the samples in FIG. 9b except that the catalyst was aged for 24 hours at 1050° C. The cumulative power spectral densities were plotted over a frequency range up to 0.11 (Hz). The illustrated measurements clearly discriminate performance of different catalysts and catalysts at different aged conditions as illustrated in FIGS. 9a, 9b and 9c. As can be seen, the cumulative power spectral densities level off at approximately 0.04 (Hz). After which, the power spectral densities have a clear profile for each different catalyst composition and aged condition.

FIG. 10 provides a further analysis based on the areas under cumulative spectral density curves (FIG. 10a) compared to using the prior art HEGO switch ratio, as recited in the Background, and illustrated in FIG. 10b; and a lab test delay time method, of the type recited in the Background, shown in FIG. 10c. It is apparent that not only can cumulative spectral densities be used to discriminate between catalysts that were active and catalysts that were deteriorating but as indicated in FIG. 10a, this method can discriminate performance within different catalysts varying from high precious metal and low oxygen storage component to high oxygen storage component with low precious metals. A review of FIG. 10a illustrates that as the catalyst ages, the hydrocarbon conversion decreases. Plots show performance for the different catalyst compositions and one layer compositions as well as two layer compositions. When analysis was applied using switch ratio as shown in FIG. 10b, as well as delayed time analysis in FIG. 10c, inconsistent plots are apparent. Accordingly, the Method of the Present Invention is believed to be more precise, consistent and accurate than the somewhat inconsistent performance using the prior art methods.

What is claimed is:

1. A method comprising the steps of:

sensing at least one parameter value as a function of time of at least one fluctuating parameter in a gaseous stream, said gaseous stream having a frequency generated, at least in part, by an ECU controlling the pistons of an internal combustion engine cyclically producing said gaseous stream, said gaseous stream including as constituents thereof, at least oxygen, hydrocarbons and nitrogen oxides, and wherein the at least one fluctuating parameter comprises the concentration of one of said constituent gases;

determining at least one frequency parameter in the frequency domain as a function of said at least one parameter value and said frequency, and a control value based on said frequency parameter; and generating a control signal based on the control value correlated to the concentration of said constituent gas selected as said fluctuating parameter.

2. The method as recited in claim 1 further comprising the step of:

comparing the frequency parameterto a preset frequency parameter value to obtain a control value.

3. A method comprising the steps of:

sensing a parameter value as a function of time of a fluctuating parameter having a frequency parameter generated at least in part by an ECU controlling the pistons of an internal combustion engine to produce a gaseous stream, said gaseous stream comprising at least nitrogen oxides, hydrocarbons and oxygen as constituents thereof, and wherein at least one fluctuating parameter comprises the concentration of one of said constituent gases;

determining a spectral density of said at least one fluctuating parameter, and a control value based on the frequency parameter; and generating a control signal based on said control value correlated to the concentration of said constituent gas selected as said fluctuating parameter.

4. The method as recited in claim 3 further comprising the step of:

comparing the spectral density to a preset spectral density value to obtain a control value.

5. A method comprising the steps of:
sensing a parameter value as a function of time of a fluctuating parameter having a frequency generated, at least in part, by an ECU controlling the pistons of an internal combustion engine to produce a gaseous stream comprising at least nitrogen oxides, hydrocarbons and oxygen as constituent gases thereof and wherein at least one fluctuating parameter comprises the concentration of one of said constituent gases;
determining a cumulative spectral density for a frequency range, and a control value based on the frequency parameter; and
generating a control signal based on said control value correlated to the concentration of said constituent gas in said stream.

6. The method as recited in claim 5 further comprising the step of:
comparing the cumulative spectral density to a preset value to obtain a control value.

7. A method comprising the steps of:
sensing an upstream parameter value as a function of time of a fluctuating upstream parameter in a gaseous stream comprising at least nitrogen oxides, oxygen and hydrocarbons as constituent gases and wherein said fluctuating parameter comprises the concentration of one of said constituent gases, the fluctuating upstream parameter having an upstream frequency in a gaseous stream upstream of a unit operation that alters said concentration of said one of said constituent gases;
determining an upstream frequency parameter as a function of the upstream parameter value and frequency, and an upstream control value based on the upstream frequency parameter value;
generating an upstream control signal based on the upstream control value;
sensing a downstream parameter value as a function of time of a downstream fluctuating parameter having a downstream frequency in said gaseous stream downstream of said unit operation;
determining a downstream frequency parameter as a function of the downstream parameter value and frequency;
generating a downstream control signal based on a downstream control value, based on the downstream frequency parameter value; and
adjusting the downstream control signal as a function of the upstream control signal.

8. The method as recited in claim 7 further comprising the steps of:
comparing the upstream frequency parameter to an upstream preset frequency parameter value to obtain the upstream control value; and
comparing the downstream frequency parameter to a downstream preset frequency parameter value to obtain a downstream control value.

9. A method comprising the steps of:
sensing an upstream parameter value as a function of time of an upstream fluctuating parameter in a gas stream comprising at least nitrogen oxides, oxygen and hydrocarbons as constituents thereof, and wherein said fluctuating parameter comprises the concentration of said constituent gases having an upstream frequency in the gaseous stream upstream of a unit operation that alters said concentration of said one of said constituent gases;
determining an upstream spectral density parameter of the upstream fluctuating parameter, and an upstream control value based at least in part on the upstream spectral density;
generating an upstream control signal based on the upstream control value;
sensing a downstream parameter value as a function of a downstream fluctuating parameter having a downstream frequency in the gaseous stream downstream of said unit operation;
determining a downstream spectral density parameter of the downstream fluctuating parameter, and a downstream control value based on the downstream spectral density;
generating a downstream control signal based on a downstream control value; and
adjusting the downstream control signal as a function of the upstream control signal.

10. The method as recited in claim 9 further comprising the steps of:
comparing the upstream spectral density parameter to an upstream preset value to obtain the upstream control value; and
comparing the downstream spectral density parameter to a downstream preset value to obtain the downstream control value.

11. A method comprising the steps of:
sensing an upstream parameter value as a function of time of an upstream fluctuating parameter in a gas stream comprising at least nitrogen oxides, oxygen and hydrocarbons as constituent gases thereof and wherein said fluctuating parameter comprises the concentration of one of said constituent gases, the fluctuating upstream parameter having an upstream frequency in the gaseous stream upstream of a unit operation that alters the concentration of said one of said constituent gases;
determining an upstream cumulative spectral density of the upstream fluctuating parameter for an upstream frequency range, and an upstream control value based on the upstream cumulative parameter value;
generating an upstream control signal based on the upstream control value;
sensing the downstream parameter value as a function of time of a downstream fluctuating parameter having a downstream frequency in the gaseous stream downstream of a unit operation;
determining a downstream cumulative spectral density for a downstream frequency range, and a downstream control value based on the downstream cumulative spectral density;
generating a downstream control signal based on the downstream control value; and
adjusting the downstream control signal as a function of the upstream control signal.

12. The method as recited in claim 11 further comprising the steps of:
comparing the upstream cumulative spectral density to an upstream preset value to obtain the upstream control value; and
comparing the downstream cumulative spectral density to a downstream preset value to obtain the downstream control value.

13. The method as recited in claim 11 wherein said upstream fluctuating parameter is the concentration of nitrogen oxides at an upstream location and said downstream fluctuating parameter is the concentration of nitrogen oxides at a downstream location downstream of the upstream location.

14. The method as recited in claim 11 wherein the downstream control signal is normalized based on the upstream control signal.

15. A method comprising the steps of:
sensing a downstream gas component, selected from nitrogen oxides, oxygen and hydrocarbon concentration as a function of time and said gas component concentration having a downstream frequency in a gaseous exhaust stream, comprising nitrogen oxides, hydrocarbons and oxygen, in an exhaust conduit downstream of a catalyst selected from a nitrogen oxide reduction catalyst, a three-way catalyst and a hydrocarbon oxidation catalyst located in the exhaust conduit;
determining a downstream frequency parameter as a function of at least one of the downstream nitrogen oxides, oxygen and hydrocarbon concentrations and downstream frequency;
comparing the downstream frequency parameter to an downstream preset value to obtain an downstream control value;
generating a downstream control signal based on the downstream control value;
assessing the performance of the hydrocarbon oxidation catalyst as a function of the downstream control signal; and
signaling, with the control signal, the performance of the hydrocarbon oxidation catalyst.

16. The method as recited in claim 15 wherein the downstream frequency parameter is the spectral density.

17. The method as recited in claim 16 wherein the downstream frequency parameter is the cumulative spectral density.

18. A method comprising the steps of:
sensing an upstream gas component, selected from nitrogen oxides, oxygen and hydrocarbon concentration, as a function of time and said gas component concentration, the gas component concentration having an upstream frequency in a gaseous exhaust stream comprising nitrogen oxides, hydrocarbons and oxygen, in an exhaust conduit upstream of a catalyst selected from a nitrogen oxide reduction catalyst, a three-way catalyst and a hydrocarbon oxidation catalyst located in the exhaust conduit;
determining an upstream frequency parameter as a function of the upstream nitrogen oxides, oxygen or hydrocarbon concentration and upstream frequency, and an upstream control value based on the upstream frequency parameter;
generating an upstream control signal based on the upstream control value;
sensing a downstream gas component, selected from oxygen and hydrocarbon concentration as a function of time and said gas component concentration having a downstream frequency in the gaseous exhaust stream, in the exhaust conduit downstream of the hydrocarbon oxidation catalyst;
determining a downstream frequency parameter as a function of the downstream oxygen or hydrocarbon concentration and downstream frequency, and a downstream control value based on the downstream frequency parameter;
generating a downstream control signal based on the downstream control value;
adjusting the downstream control signal as a function of the upstream control signal;
assessing the performance of the hydrocarbon oxidation catalyst as a function of the adjusted downstream control signal; and
signaling the performance of the hydrocarbon oxidation catalyst.

19. The method as recited in claim 18 further comprising the steps of:
comparing the upstream frequency parameter to an upstream preset frequency parameter value to obtain the upstream control value; and
comparing the downstream frequency parameter to a downstream preset frequency parameter value to obtain the downstream control value.

20. The method as recited in claim 18 wherein the upstream frequency parameter is the upstream spectral density and the downstream frequency parameter is the downstream spectral density.

21. The method as recited in claim 18 wherein the upstream frequency parameter is the upstream cumulative spectral density and the downstream frequency parameter is the downstream cumulative spectral density.

22. The method as recited in claims 1, 3, 4, 5, 7, 9, 11, 12, 13, 15, 18, 19, 20 or 21 over a frequency range of from 0 up to about 1.5.

23. The method as recited in claim 22 over a frequency range of from 0 to 0.5.

24. An apparatus comprising:
a conduit through which a gaseous stream comprising nitrogen oxides flow;
a unit operation in communication with the conduit for altering the concentration of said nitrogen oxides in said gaseous stream;
a sensor located downstream of said unit operation, said sensor comprising a means to measure a fluctuating downstream parameter value as a function of time of said fluctuating downstream parameter having a downstream frequency in said gaseous stream, and wherein said fluctuating parameter comprises the concentration of nitrogen oxides;
means to determine a frequency parameter in the frequency domain as a function of said downstream parameter value and said downstream frequency;
means to compare said downstream frequency parameter to a preset downstream frequency parameter value to obtain a downstream control value; and
means to generate a downstream control signal based on said downstream control value.

25. The apparatus as recited in claim 24 wherein the downstream frequency parameter is a downstream spectral density.

26. The apparatus as recited in claim 25 wherein the downstream frequency parameter is a downstream cumulative spectral density.

27. An apparatus comprising:
a conduit;
a unit operation in communication with the conduit;
a sensor located downstream of the unit operation, the sensor comprising a means to measure a downstream parameter value as a function of time of a fluctuating downstream parameter having a downstream frequency in a gaseous stream comprising nitrogen oxides, and wherein the at least one fluctuating parameter comprises the concentration of nitrogen oxides;
means to determine a frequency parameter as a function of the downstream parameter value and downstream frequency;

means to compare the downstream frequency parameter to a preset downstream frequency parameter value to obtain a downstream control value;

means to generate a downstream control signal based on the downstream control value; and, wherein the unit operation is selected from the group of a catalyst, reactor and adsorber.

28. An apparatus comprising:

a conduit;

a catalyst in communication with the conduit;

an upstream sensor located upstream of the catalyst, the upstream sensor comprising a means to measure an upstream parameter value as a function of time of a fluctuating upstream parameter having an upstream frequency in a gaseous stream comprising nitrogen oxides, and wherein the at least one fluctuating parameter comprises the concentration of nitrogen oxides;

means to determine an upstream frequency parameter as a function of the upstream parameter value and upstream frequency, and an upstream control value;

means to generate an upstream control signal based on an upstream control value;

a downstream sensor located downstream of the catalyst, the downstream sensor comprising a means to measure a downstream parameter value as a function of time of a fluctuating downstream parameter having a downstream frequency in the gaseous stream;

means to determine a downstream frequency parameter as a function of the downstream parameter value and frequency, and a downstream control value, based on the downstream frequency parameter;

means to generate a downstream control signal based on a downstream control value; and means to adjust the downstream control signal as a function of the upstream control signal.

29. The apparatus as recited in claim 28 further comprising:

means to compare the upstream frequency parameter to an upstream preset frequency parameter value to obtain an upstream control value; and means to compare the downstream frequency parameter to a downstream preset frequency parameter value to obtain a downstream control value.

30. The apparatus as recited in claim 28 when the upstream frequency control parameter is the upstream spectral density, and the downstream frequency control parameter is the downstream spectral density.

31. The apparatus as recited in claim 28 when the upstream frequency control parameter is the upstream cumulative spectral density, and the downstream frequency control parameter is the downstream cumulative spectral density.

32. An apparatus comprising:

a conduit;

a catalyst selected from a nitrogen reduction catalyst and a three-way catalyst located in the conduit catalyst;

an upstream sensor located in communication with the conduit upstream of the catalyst, the upstream sensor comprising means to sense upstream gas component, selected from nitrogen oxides, oxygen and hydrocarbon concentration as a function of time and said gas component having an upstream frequency, in the exhaust conduit upstream of the upstream of the catalyst;

means to determine an upstream frequency parameter as a function of the upstream gas component concentration and upstream frequency, and an upstream control value, based on the upstream frequency parameter value;

means to generate an upstream control signal based on an upstream control value;

a downstream sensor selected from an oxygen sensor and a hydrocarbon sensor located downstream of the catalyst, the downstream sensor comprising means to sense a downstream gas component, selected from nitrogen oxides, oxygen and hydrocarbon concentration as a function of time and said gas component having a downstream frequency, in the exhaust conduit downstream of the catalyst;

means to determine a downstream frequency parameter as a function of the downstream gas component concentration and downstream frequency, and a control value based on the downstream frequency parameter value;

means to generate a downstream control signal based on a downstream control value;

means to adjust the downstream control signal as a function of the upstream control signal;

means to assess the performance of the catalyst as a function of the adjusted downstream control signal and generate a performance signal; and an indicator to indicate catalyst performance.

33. The apparatus as recited in claim 32 further comprising:

means to compare the upstream frequency parameter to an upstream preset value to obtain an upstream control value; and means to compare the downstream frequency parameter to a downstream preset value to obtain a downstream control value.

34. The apparatus as recited in claim 32 when the upstream frequency control parameter is the upstream spectral density, and the downstream frequency control parameter is the downstream spectral density.

35. The apparatus as recited in claim 32 when the upstream frequency control parameter is the upstream cumulative spectral density, and the downstream frequency control parameter is the downstream cumulative spectral density.

36. The apparatus of claims 31 or 35 wherein the cumulative spectral density is the sum of the power spectral densities over a frequency range of from 0 to 1.5 (Hz).

37. The apparatus as recited in claims 24, 28 or 32 wherein there is a means to determine the frequency parameter over a range of from 0 to 1.5.

38. The apparatus as recited in claim 37 wherein there is a means to determine the frequency parameter over a range of from 0 to 0.5.

39. The apparatus as recited in claims 24, 28 or 32 wherein the catalyst comprises at least one catalytic component and at least one oxygen storage component.

40. The apparatus as recited in claim 39 further comprises a catalyst substrate wherein the catalyst is supported on the substrate and comprises a layered catalyst composite comprising a first inner layer and a second outer layer:

the first layer comprising:
a first support;
a first palladium component;
a first platinum group component;
at least one of the following, i) a first stabilizer; ii) first rare earth metal component; and iii) a zirconium compound; and the second layer comprising:
  a second support;
  a second platinum component;
  a rhodium component;
  an oxygen storage composition comprising a diluted second oxygen storage component; where
    the total amount of platinum component of the composite comprises from 50 to 100 weight percent based on platinum metal of the second platinum component based on the total of the first and second platinum components.

41. The apparatus as recited in claim 39 further comprises a catalyst substrate wherein the catalyst is supported on the substrate and comprises a layered catalyst composite comprising a first inner layer and a second outer layer:
  the first layer comprising:
    a first support;
    a palladium component;
    a first platinum component;
    at least one first stabilizer;
    at least one first rare earth metal component; and
  the second layer comprising:
    a second support;
    a second platinum component;
    a rhodium component;
    an oxygen storage composition comprising a diluted second oxygen storage component; and where
      the total amount of platinum compo n ents of the composite comprising from 0 to less than fifty weight percent based on the platinum metal of the first platinum component based on the total of the first and second platinum group components.

42. The apparatus as recited in claim 39 further comprises a catalyst substrate wherein the catalyst is supported on the substrate and comprises a layered catalyst composite comprising a first layer and a second layer:
  the first layer comprising:
    a first support;
    at least one first platinum group metal component; and
    an oxygen storag e component in intimate contact with the platinum group metal component; and
  the second layer comprising:
    a second support; and
    at least one second platinum group metal component.

43. The apparatus as recited in claim 42 wherein the first layer further comprises:
  a first zirconium component;
    at least one first alkaline earth metal component; and
    at least one first rare earth metal component selected from the group consisting of lanthanum metal components and neodymium metal components; and
  the second layer further comprises:
    a second zirconium component;
    at least one second alkaline earth metal component; and
    at least one second rare earth metal component selected from the group consisting of lanthanum metal components and neodymium metal components.

44. The apparatus as recited in claim 39 further comprises a catalyst substrate wherein the catalyst is supported on the substrate and comprises a layered catalyst composite comprising a first layer and a second layer:
  the first layer comprising:
    a first support;
    at least one first palladium component; and
    a first oxygen storage component in intimate contact with the palladium component; and
  the second layer comprising:
    a second support; and
    at least one second palladium component.

45. The apparatus as recited in claim 39 further comprises a catalyst substrate wherein the catalyst is supported on the substrate and comprises a layered catalyst composite comprising a first layer and a second layer:
  the first layer comprising:
    a first support;
    at least one palladium component, wherein the first palladium component is substantially the only platinum group metal component in the first layer;
    a first oxygen storage component in intimate contact with the first palladium component; and,
    at least one of the following: i) a first zirconium component; ii) a first alkaline earth metal component; and iii) at least one first rare earth metal component selected from the group consisting of lanthanum metal components and neodymium metal components, wherein the first layer requires at least one first alkaline earth metal component and at least one first rare earth metal component; and
  the second layer comprising:
    a second support;
    at least one second palladium component, wherein the second palladium component is substantially the only platinum group metal component in the second layer; and,
    at least one of the following: i) a second zirconium component; ii) a second alkaline earth metal component; and iii) at least one second rare earth metal component selected from the group consisting of lanthanum metal components and neodymium metal components, wherein the second layer requires at least one of the second alkaline earth metal component and at least one second rare earth metal component.

46. The apparatus as recited in claim 39 further comprises a catalyst substrate wherein the catalyst is supported on the substrate and comprises and further comprising:
  a gasoline engine having an exhaust outlet;
  a close coupled catalyst in communication with the exhaust outlet, the close coupled catalyst comprising a close coupled catalyst composition having substantially no oxygen storage components selected from the group consisting of cerium compo nents and praseodymium components, the catalyst composition comprising:
    a support;
    a palladium component;
    at least one of the following: i) at least one alkaline metal oxide selected from the group consisting of strontium oxide, calcium oxide and barium oxide; ii) a platinum group metal component selected from the group consisting of platinum, rhodium, ruthenium and iridium components; iii) a rare earth oxide selected from the group consisting of neodymium oxide and lanthanum oxide; and, iv) a second zirconium oxide; and
  a downstream catalyst located downstream of and in communication with the close-coupled catalyst, the downstream catalyst comprising an oxygen storage component selected from the group consisting of cerium components and praseodymium components.

* * * * *